United States Patent
Hirai et al.

(10) Patent No.: US 12,328,027 B2
(45) Date of Patent: Jun. 10, 2025

(54) POWER SUPPLY DEVICE AND BATTERY PACK CHARGING METHOD

(71) Applicant: Mitsubishi Electric Corporation, Tokyo (JP)

(72) Inventors: Seiji Hirai, Tokyo (JP); Daigo Takemura, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 579 days.

(21) Appl. No.: 17/792,401

(22) PCT Filed: Mar. 26, 2020

(86) PCT No.: PCT/JP2020/013540
§ 371 (c)(1),
(2) Date: Jul. 13, 2022

(87) PCT Pub. No.: WO2021/192126
PCT Pub. Date: Sep. 30, 2021

(65) Prior Publication Data
US 2023/0055759 A1    Feb. 23, 2023

(51) Int. Cl.
*H02J 7/00* (2006.01)
*H02J 7/34* (2006.01)

(52) U.S. Cl.
CPC ........ *H02J 7/00714* (2020.01); *H02J 7/0016* (2013.01); *H02J 7/0047* (2013.01); *H02J 7/345* (2013.01)

(58) Field of Classification Search
CPC .................................................. H02J 7/00714
(Continued)

(56) References Cited

U.S. PATENT DOCUMENTS

| 7,531,986 B2* | 5/2009 | Eager ................... H02J 7/0068 |
| | | 320/110 |
| 2009/0021222 A1 | 1/2009 | Kudo et al. |

(Continued)

FOREIGN PATENT DOCUMENTS

| JP | 2007-305451 A | 11/2007 |
| JP | 2009-27839 A | 2/2009 |
| JP | 2010-231939 A | 10/2010 |

OTHER PUBLICATIONS

International Search Report and Written Opinion mailed on Jun. 30, 2020, received for PCT Application PCT/JP2020/013540, filed on Mar. 26, 2020, 8 pages including English Translation.

*Primary Examiner* — Yalkew Fantu
(74) *Attorney, Agent, or Firm* — XSENSUS LLP

(57) ABSTRACT

The power supply device is provided with: a battery pack that comprises a plurality of battery units each of which includes a battery, a first terminal and a second terminal; a capacitor connected in parallel with the battery pack; and a current adjusting circuit that includes a load and a switching device for controlling a current to the load and adjusts a current from the capacitor to the battery pack. When a battery that has reached an upper limit voltage is detected during charging the battery pack, between control for closing a first path that connects the first terminal to the positive side of the battery and control for opening a second path that connects the first terminal to the second terminal and negative side of the battery, the power supply device causes the current to flow to the load to adjust the current flowing to the battery pack.

20 Claims, 26 Drawing Sheets

(58) Field of Classification Search
USPC .......................................................... 320/116
See application file for complete search history.

(56) References Cited

U.S. PATENT DOCUMENTS

| 2016/0105045 A1* | 4/2016 | Kabasawa | H02J 7/007184 |
| | | | 320/116 |
| 2019/0273228 A1* | 9/2019 | Takahashi | H02J 7/00047 |
| 2022/0209564 A1* | 6/2022 | Hashimoto | B60L 53/16 |

* cited by examiner

POWER SUPPLY DEVICE AND BATTERY PACK CHARGING METHOD

CROSS-REFERENCE TO RELATED APPLICATIONS

The present application is based on PCT filing PCT/JP2020/013540, filed Mar. 26, 2020, the entire contents of which is incorporated herein by reference.

TECHNICAL FIELD

The present application relates to a power supply device and a battery pack charging method.

BACKGROUND ART

In recent years, a power supply system having a battery pack in which a plurality of batteries are connected in series is used as a power supply in an electric vehicle, a hybrid electric vehicle, a household electric appliance, a stationary storage battery system, and the like. A battery constituting the battery pack is also called a battery cell. When a failure or the like occurs in one of the batteries in a battery pack, the battery pack cannot be used because the plurality of batteries are connected in series.

For example, Patent Document 1 discloses a cell controller for adjusting the balance of battery cells in the battery pack during discharge. In the cell controller of Patent Document 1, a capacity adjustment resistor is inserted in series through a switching device in a voltage detection line for detecting a voltage for each of the battery cells, and the switching device is maintained in an OFF state to perform the voltage detection except during a bypass control period for performing a capacity adjustment, and thus the capacity adjustment and the voltage detection are performed.

CITATION LIST

Patent Document

Patent Document 1: Japanese Patent Application Publication Laid-open No. 2009-27839 (FIG. 1, FIG. 3)

SUMMARY OF INVENTION

Problems to be Solved by Invention

Typically, in a power supply system (power supply device) having the battery pack, a capacitor is connected in parallel to the battery pack in order to suppress a pulsating current flowing to the battery pack. As described above, when a failure or the like occurs in one of the batteries in the battery pack, the battery pack cannot be used because the plurality of batteries are connected in series. In order to avoid this problem, by bypassing the failed battery or the like, the battery pack can be used continuously. Further, when the battery pack has a degraded battery, the degraded battery (deteriorated battery) reaches full charge faster than the other batteries, and therefore, in order to avoid further deterioration of the deteriorated batteries, it is necessary to separate the deteriorated battery and charge the other batteries in order to fully charge the battery pack. As described above, the cell controller disclosed in Patent Document 1 adjusts the balance of the battery cells in the battery pack during discharge but does not disclose charging of the other battery by separating the deteriorated battery. In the cell controller of Patent Document 1, a case is considered in which the deteriorated battery is disconnected, and the other batteries are charged. In the cell controller of Patent Document 1, when the deteriorated battery is bypassed and separated from a charging/discharging circuit of the battery pack during charging, a difference occurs between the voltage of the capacitor and the voltage of the battery pack, and a large current flows to the batteries other than the bypassed deteriorated battery. When a large current flows in the battery of the battery pack, a problem of degradation of the battery arises.

It is an object of a technology disclosed in the present specification to provide a power supply device capable of continuing charging such that a large current does not flow to the remaining batteries when the deteriorated battery is bypassed.

Means for Solving Problems

An example of a power supply device disclosed in the present specification is a power supply device provided with a plurality of power storage units each of which has a battery, a first terminal, and a second terminal. The power supply device comprises a battery pack including the plurality of power storage units connected in series each of which has a first path and a second path, the first path connecting a positive side of the battery and the first terminal, the second path connecting a negative side of the battery, the second terminal, and the first terminal, a capacitor connected in parallel to the battery pack, a charging circuit to charge the battery pack, a current adjusting circuit to adjust a current flowing from the capacitor to the positive side of the battery pack, an information detector to output state detection information containing a battery voltage of the battery and a capacitor voltage of the capacitor, and a battery pack control circuit to control opening/closing of the first path and opening/closing of the second path in the power storage unit, and the current adjusting circuit based on the state detection information. The current adjusting circuit includes a load through which a current flows and a switching device to control a flow and a cutoff of the current to the load. The battery pack control circuit, when the battery having reached an upper limit voltage is detected based on the state detection information during charging of the battery pack, closes the first path in the power storage unit having a bypass target battery that is the battery having reached the upper limit voltage and controls the switching device in the current adjusting circuit to cause a current to flow through the load. After that, the battery pack control circuit opens the second path in the power storage unit including the bypass target battery, and then controls the switching device to cut off the current flow to the load.

Effect of Invention

The power supply device of an example disclosed in the present specification, when detecting a battery that has reached the upper limit voltage, adjusts the current flowing to the positive side of the battery pack by causing a current to flow through the load of the current adjusting circuit between closing control of the first path and opening control of the second path in the battery, so that charging can be continued such that a large current does not flow to the remaining batteries when the deteriorated battery that has reached the upper limit voltage earlier than other batteries is bypassed.

MODES FOR CARRYING OUT INVENTION

Embodiment 1

Figure 1:
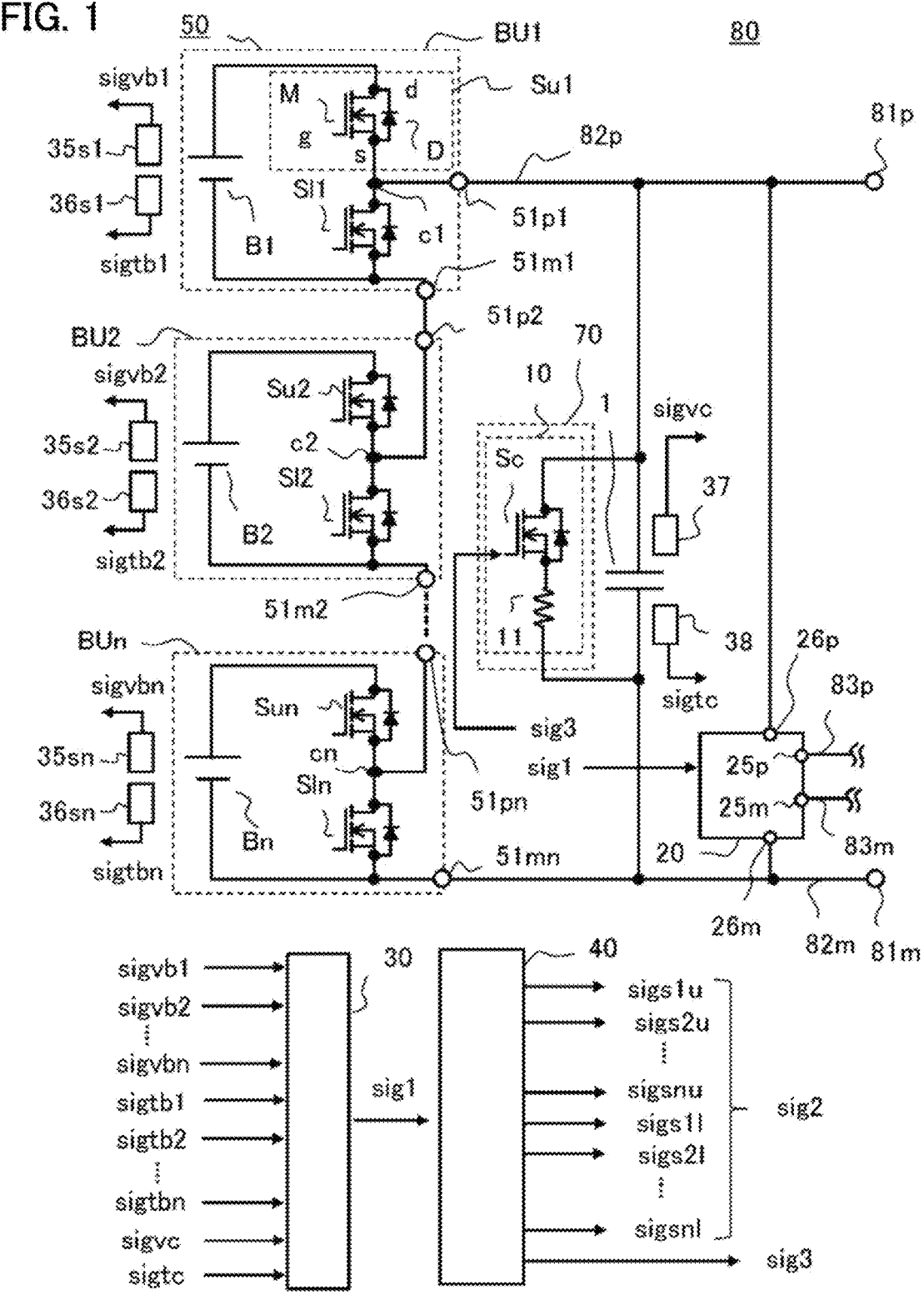
FIG. 1 is a diagram showing a configuration of a power supply device according to Embodiment 1.
Figure 2:
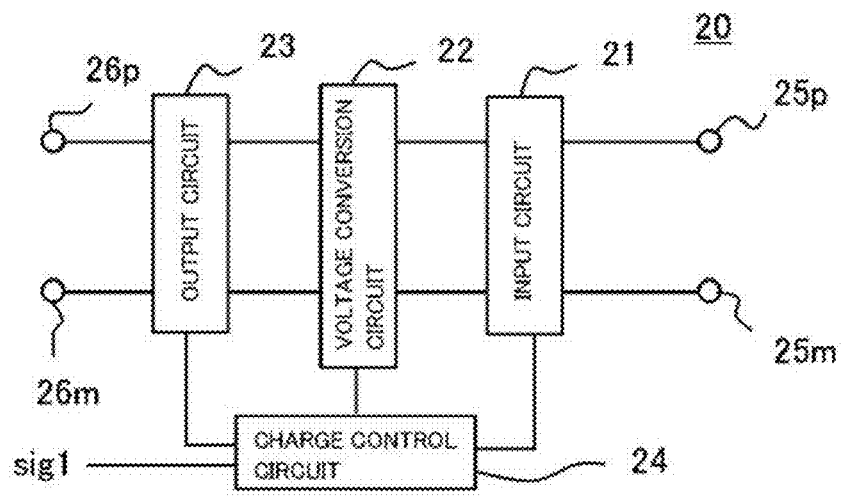
FIG. 2 shows a configuration of a charging circuit of FIG. 1.
Figure 3:
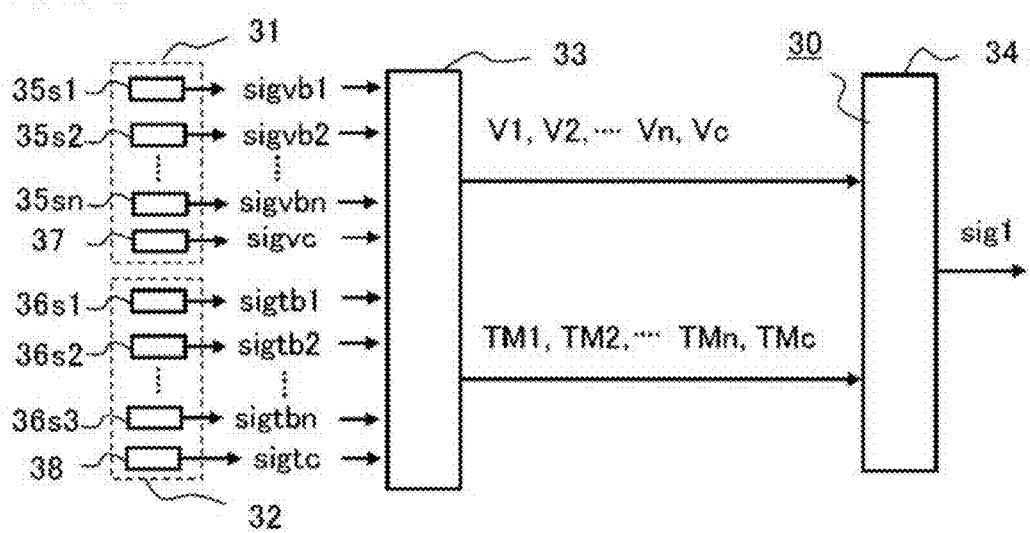
FIG. 3 shows a configuration of an information detector of FIG. 1.
Figure 4:
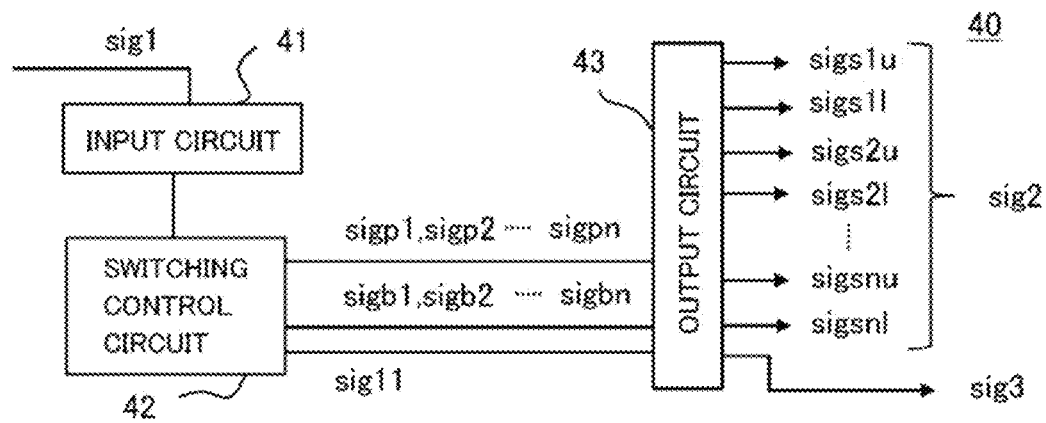
FIG. 4 shows a configuration of a battery pack control circuit of FIG. 1.
Figure 5:
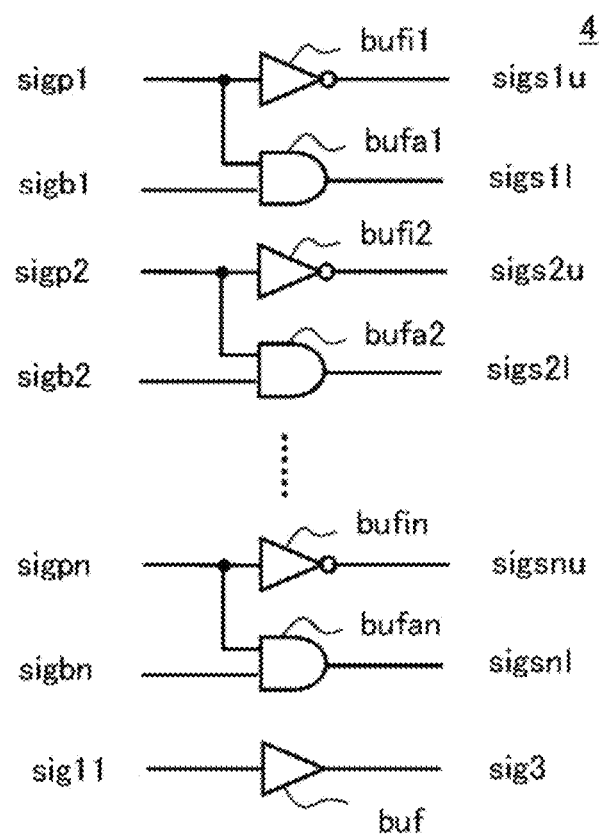
FIG. 5 shows a configuration of an output circuit of FIG. 4.

FIG. 1 is a diagram showing a configuration of a power supply device according to Embodiment 1, and FIG. 2 is a diagram showing a configuration of a charging circuit of FIG. 1. FIG. 3 is a diagram showing a configuration of an information detector of FIG. 1, and FIG. 4 is a diagram showing a configuration of a battery pack control circuit of FIG. 1. FIG. 5 is a diagram showing a configuration of an output circuit of FIG. 4.

Figure 6:
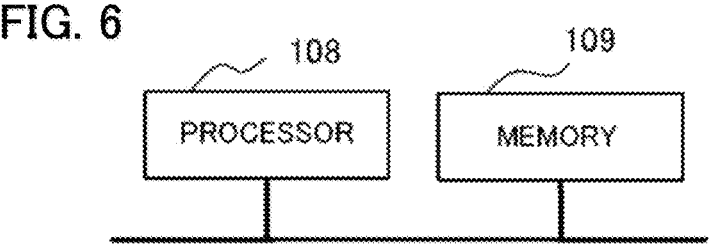
FIG. 6 shows an example of a hardware configuration for implementing functions of the information detector and the battery pack control circuit in FIG. 1, and a charge control circuit of FIG. 2.
Figure 7:
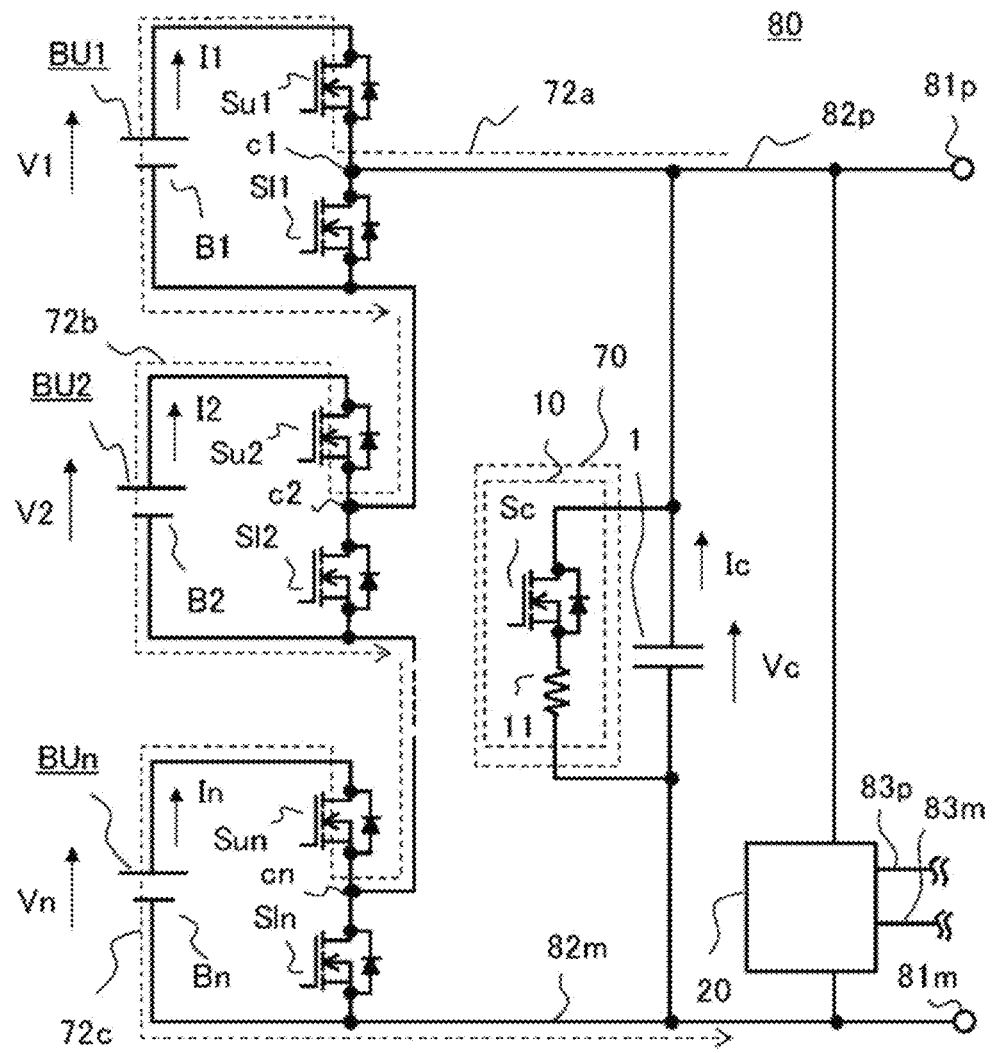
FIG. 7 is a diagram showing a first example of a charging path of the battery pack.
Figure 8:
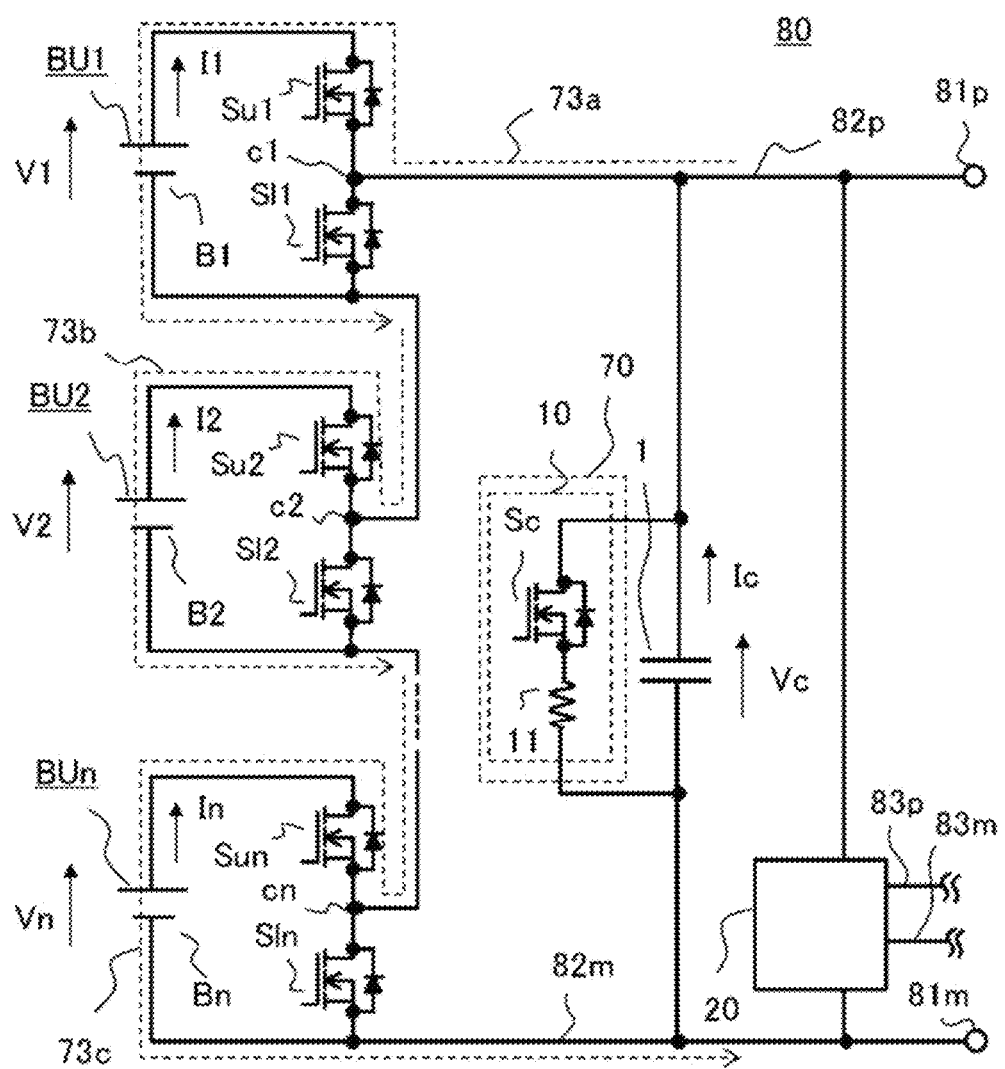
FIG. 8 is a diagram showing a second example of the charging path of the battery pack.
Figure 9:
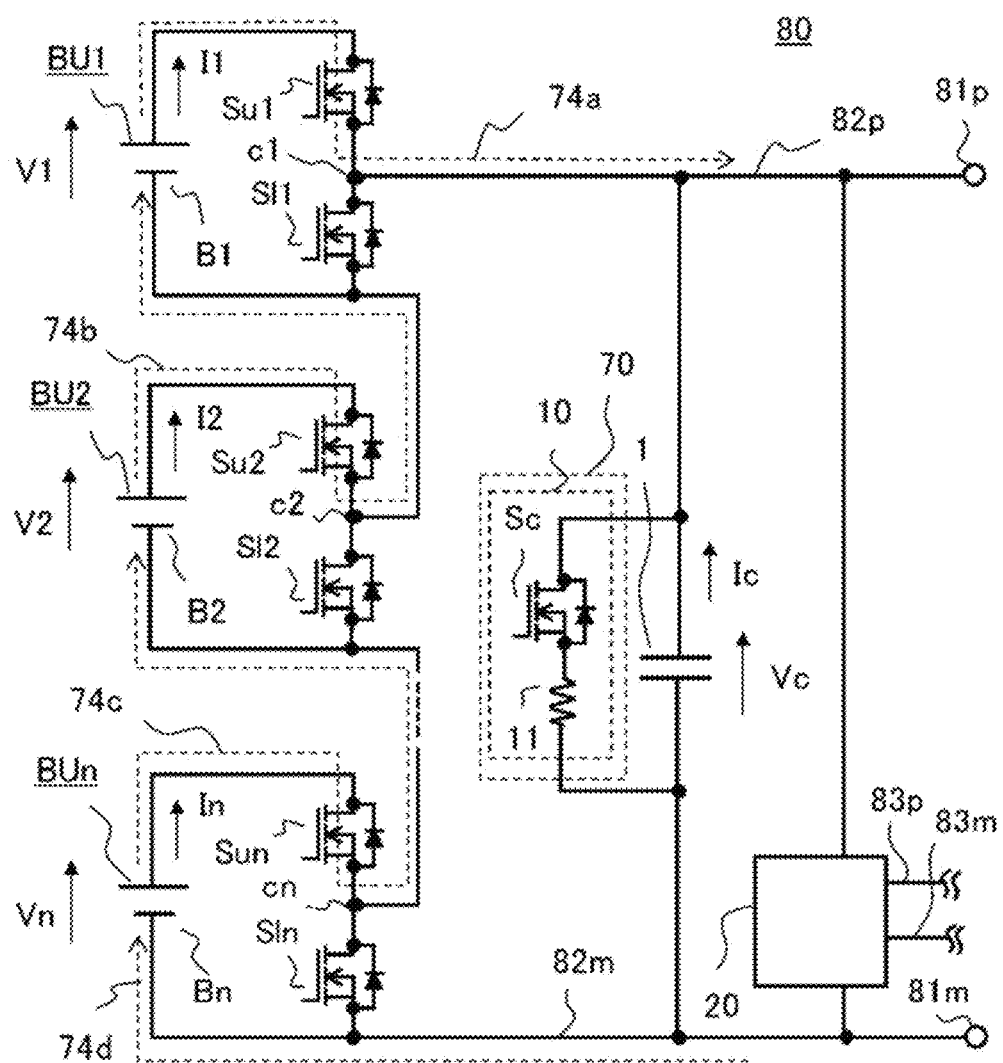
FIG. 9 is a diagram showing a discharging path of the battery pack.
Figure 10:
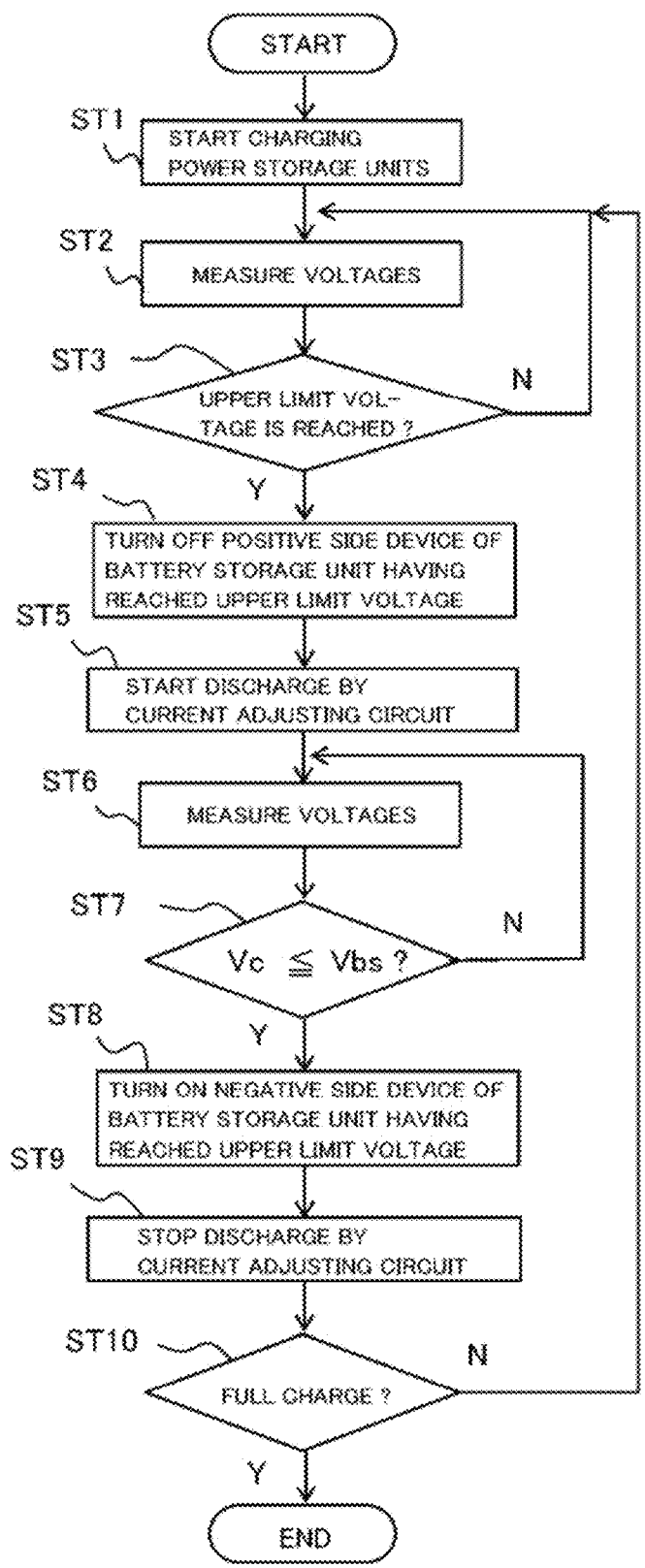
FIG. 10 is a flowchart explaining a charging operation of the power supply device according to Embodiment 1.
Figure 11:
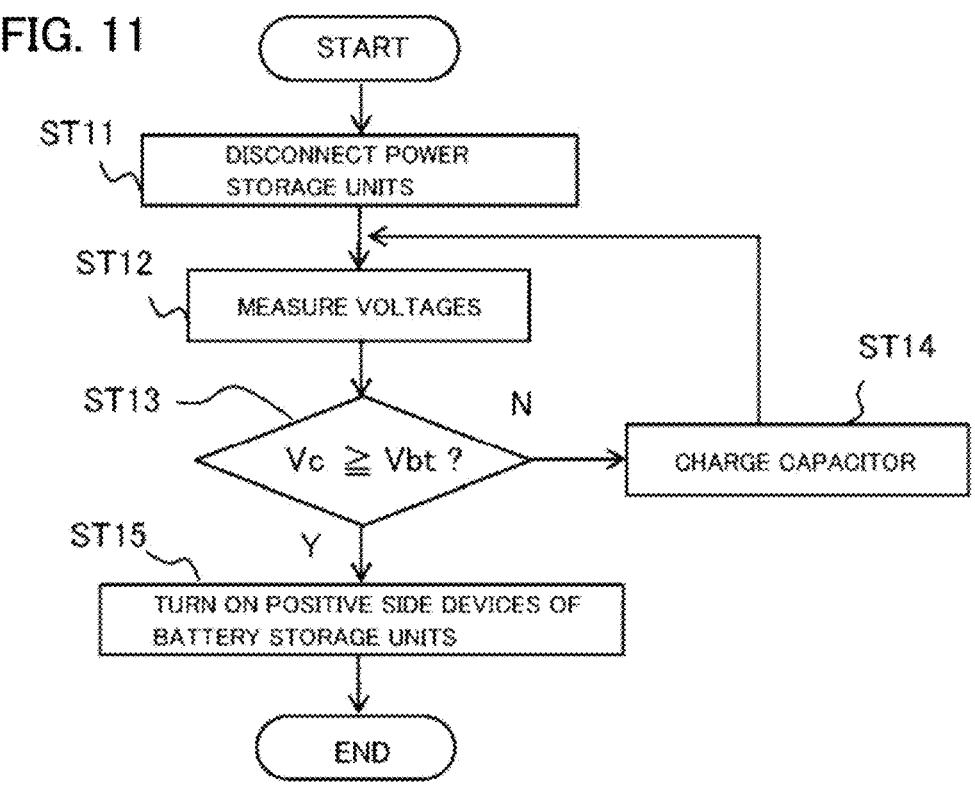
FIG. 11 is a flowchart explaining a reconnection operation of a separated battery in the power supply device according to Embodiment 1.
Figure 12:
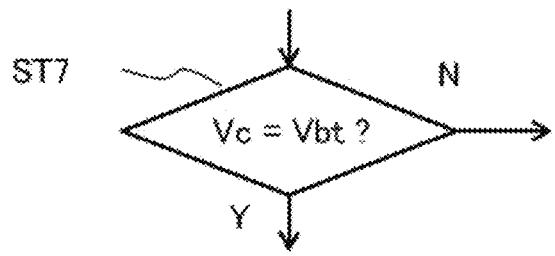
FIG. 12 is a diagram showing another step ST7.
Figure 13:
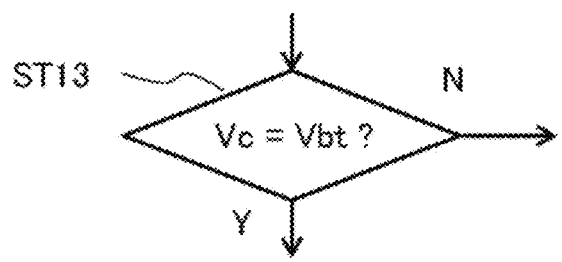
FIG. 13 is a diagram showing another step ST13.
Figure 14:
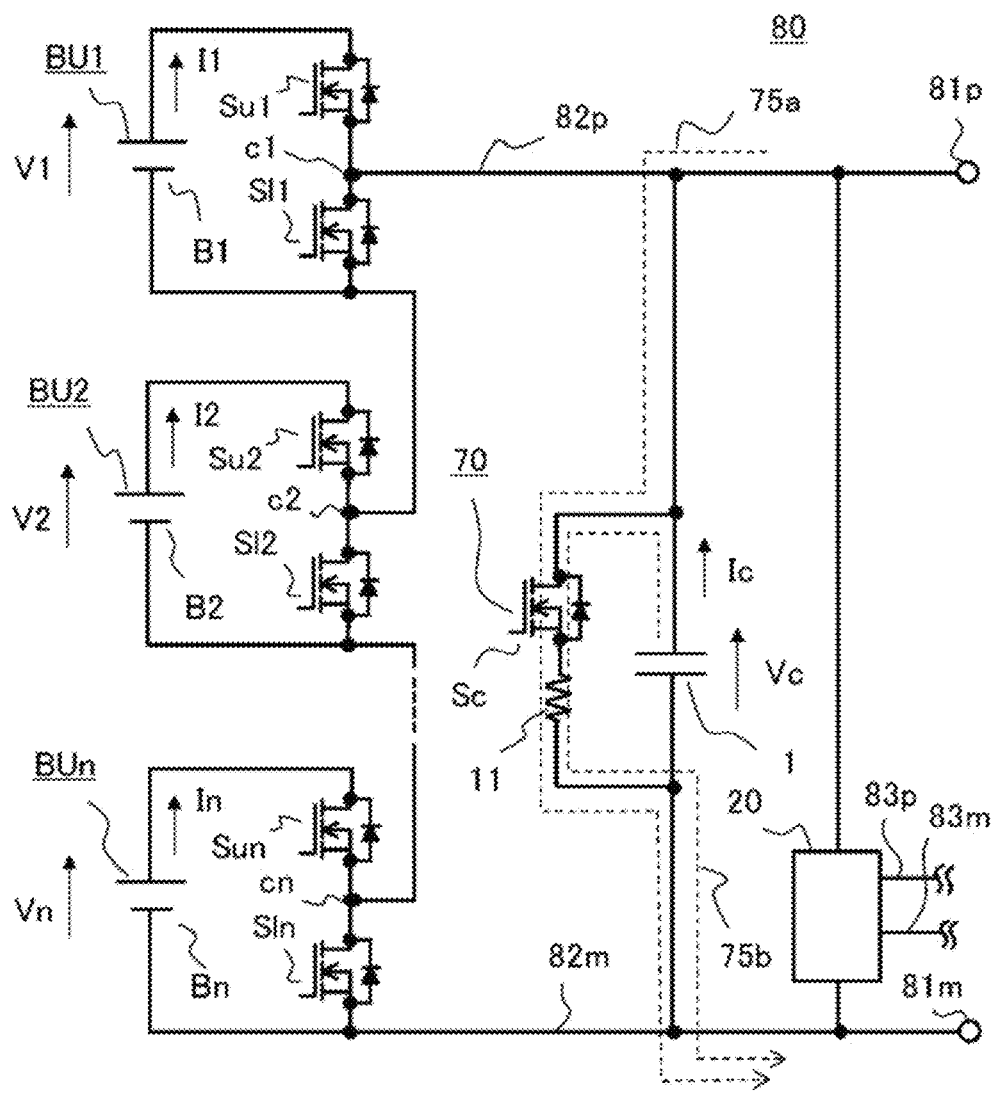
FIG. 14 is a diagram showing a current path of a current adjusting circuit of FIG. 1.
Figure 15:
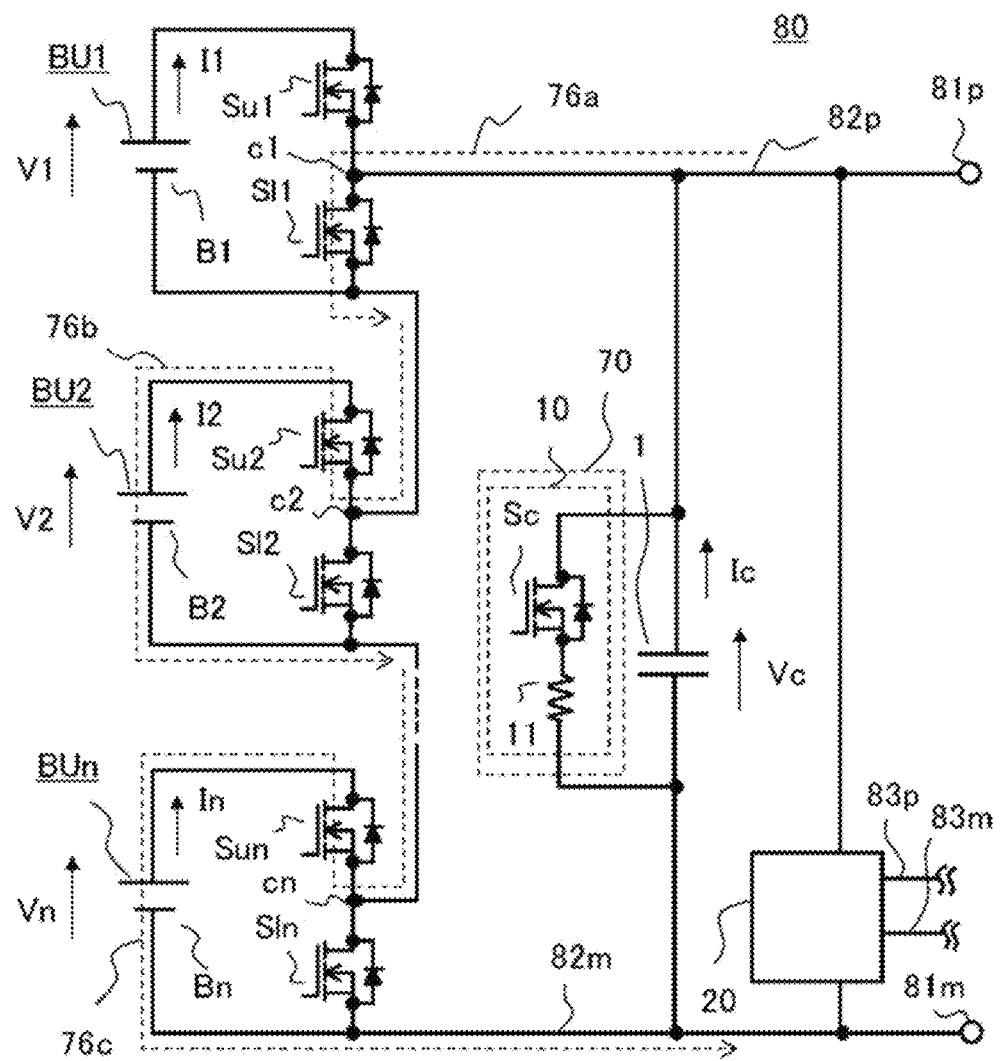
FIG. 15 is a diagram showing a first example of the charging path of the battery pack when one battery is bypassed.
Figure 16:
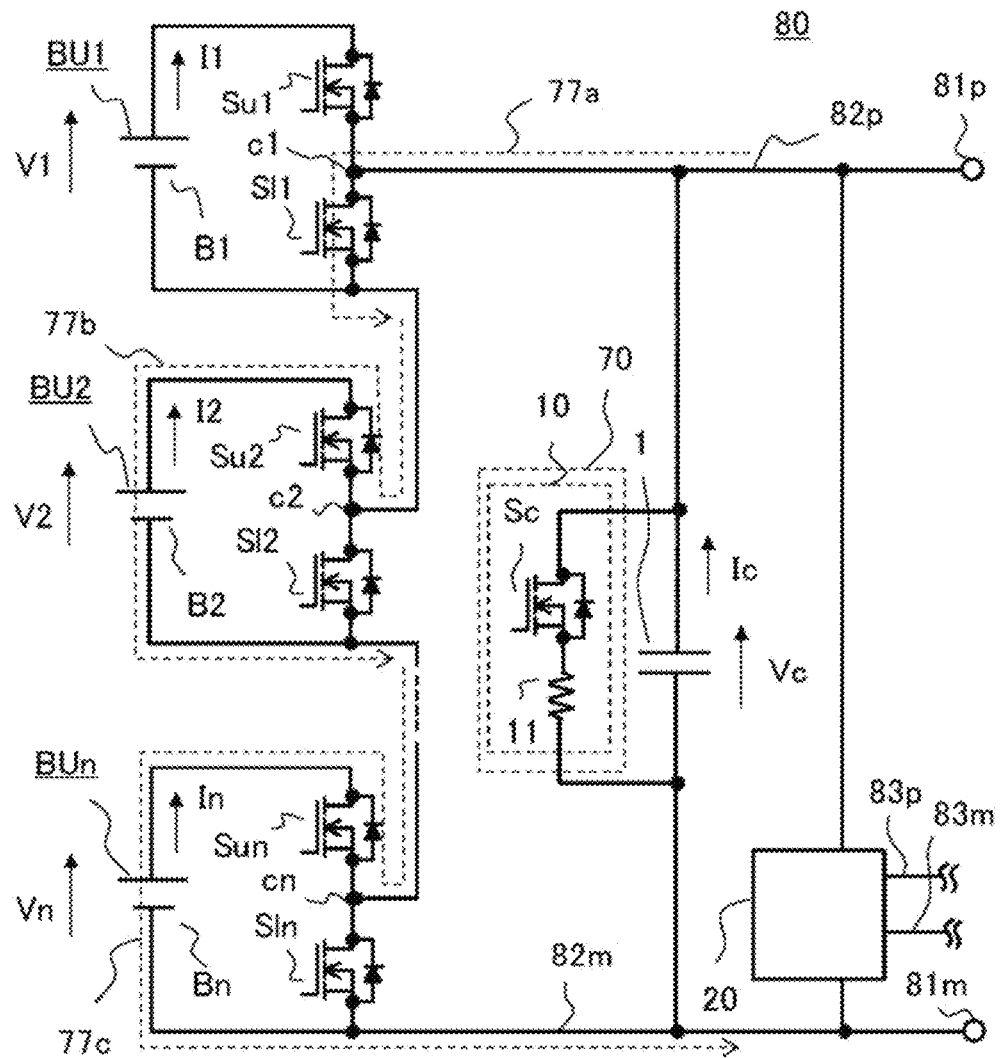
FIG. 16 is a diagram showing a second example of the charging path of the battery pack when one battery is bypassed.
Figure 17:
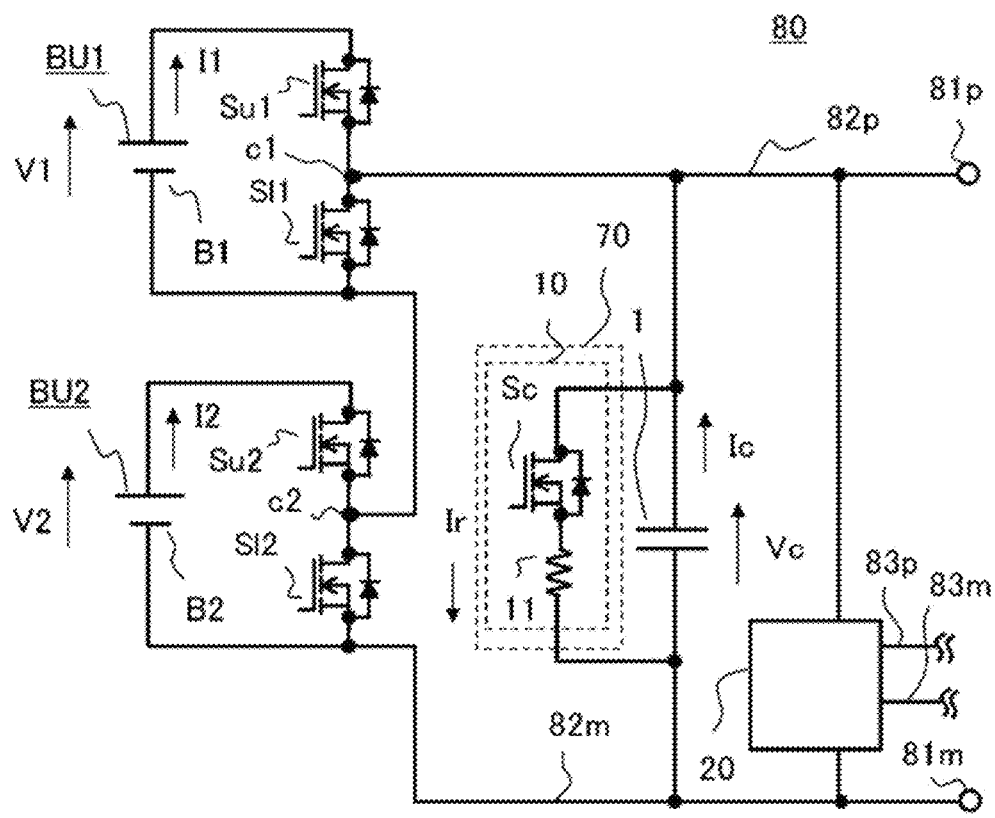
FIG. 17 is a diagram showing a power supply device with two batteries.
Figure 18:
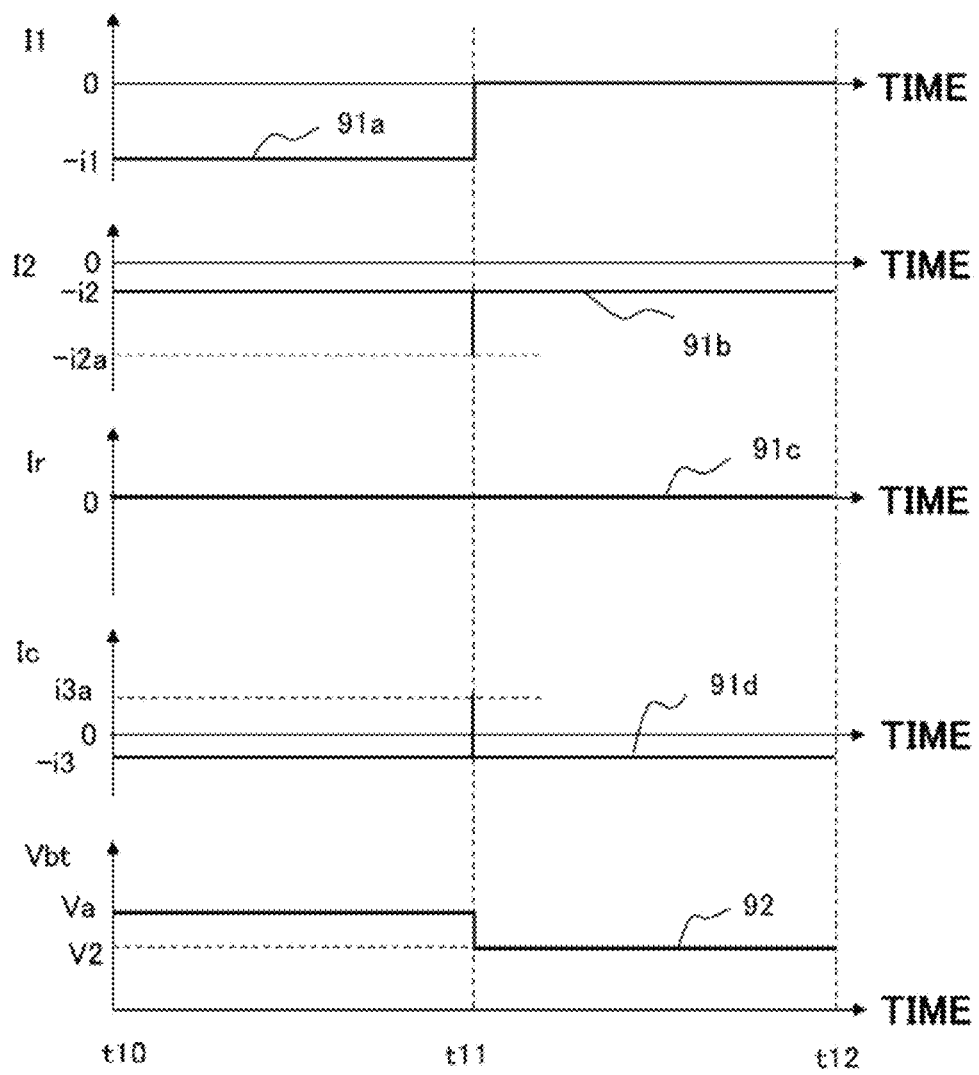
FIG. 18 is a diagram showing currents and a battery pack voltage of a power supply device according to a comparative example.
Figure 19:
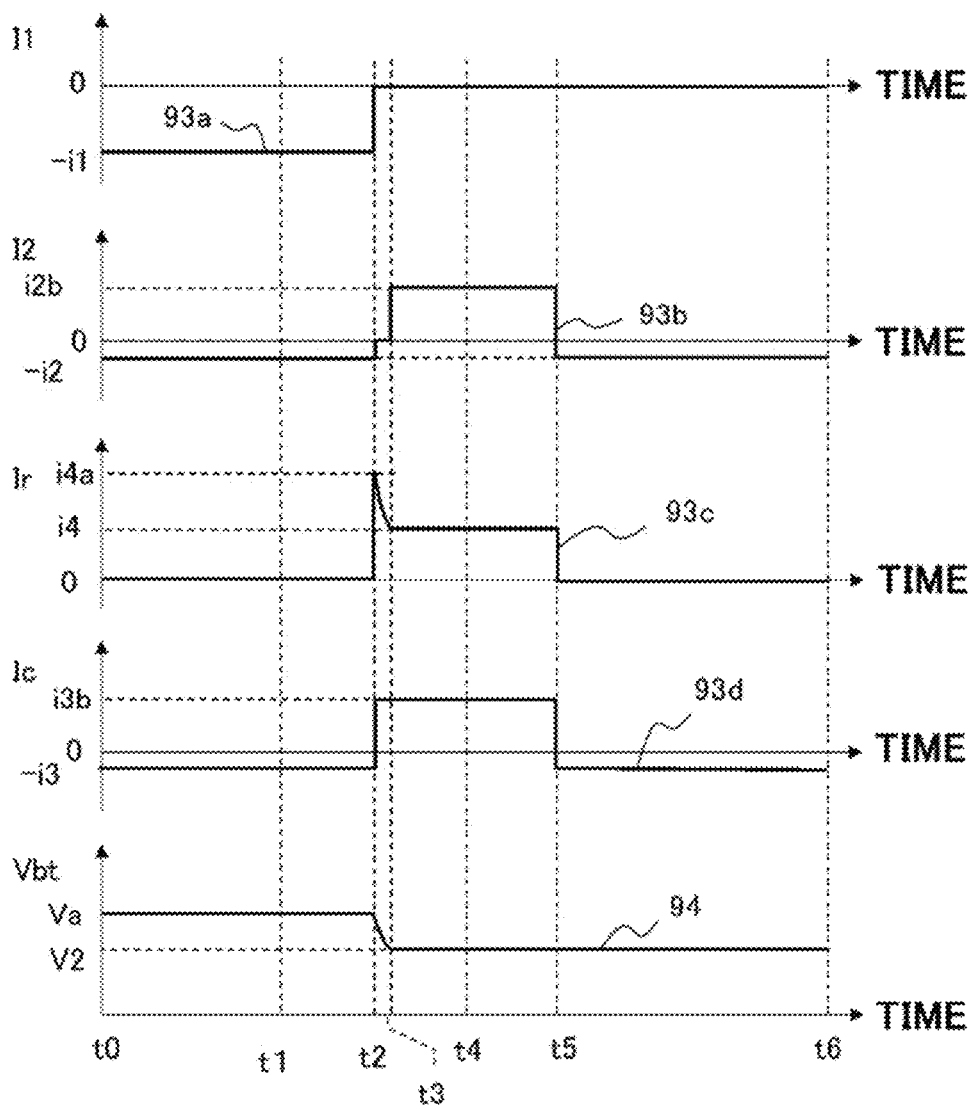
FIG. 19 is a diagram showing currents and a battery pack voltage of a power supply device according to Embodiment 1.
Figure 20:
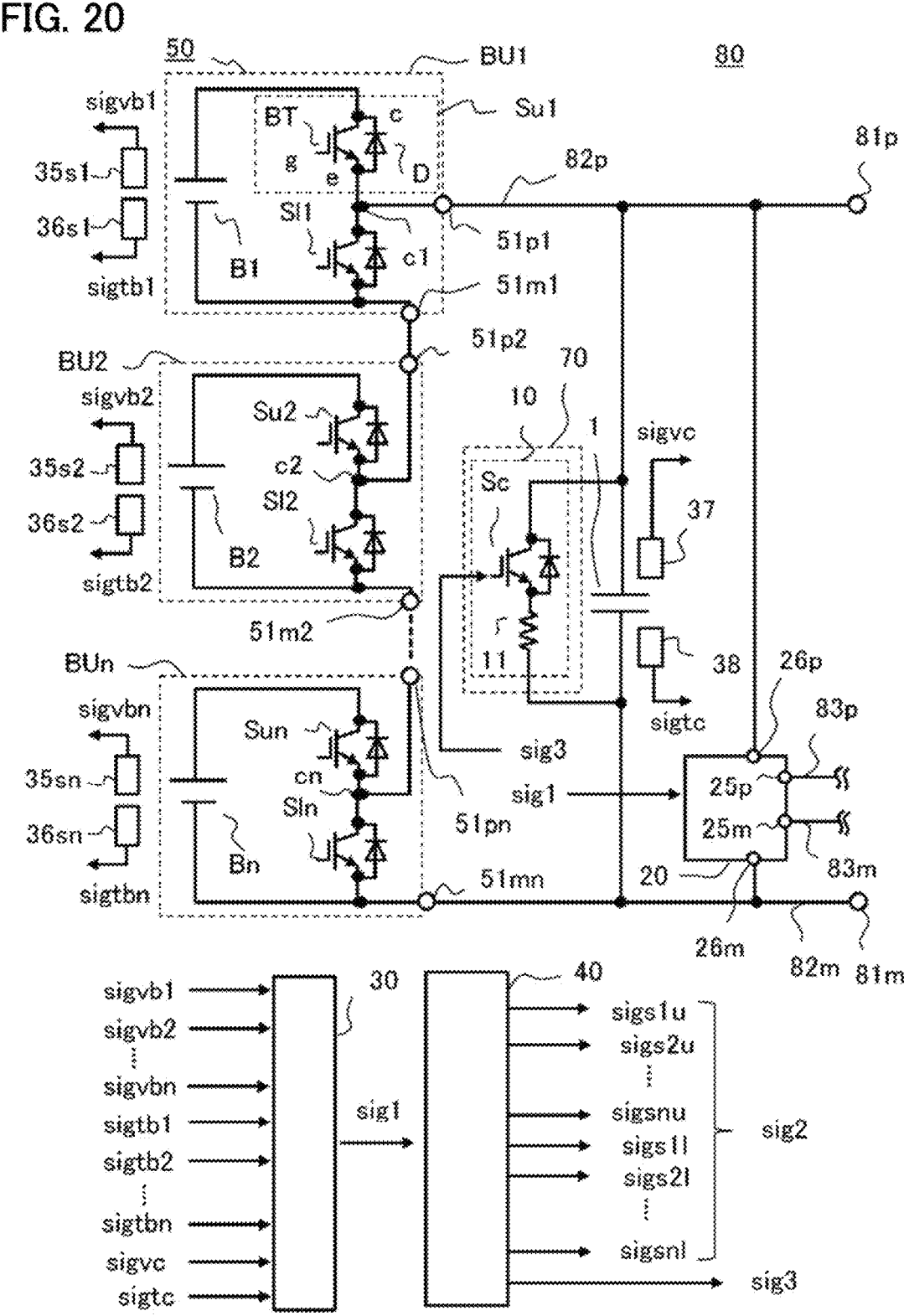
FIG. 20 is a diagram showing a configuration of another power supply device according to Embodiment 1.

FIG. 6 is a diagram showing a hardware configuration example for implementing functions of the information detector and the battery pack control circuit of FIG. 1, and a charge control circuit of FIG. 2. FIG. 7 is a diagram showing a first example of a charging path of the battery pack, FIG. 8 is a diagram showing a second example of the charging path of the battery pack, and FIG. 9 is a diagram showing a discharging path of the battery pack. FIG. 10 is a flowchart explaining a charging operation of the power supply device according to Embodiment 1. FIG. 11 is a flowchart explaining a reconnection operation of a separated battery in the power supply device according to Embodiment 1. FIG. 12 is a diagram showing another step ST7, and FIG. 13 is a diagram showing another step ST13. FIG. 14 is a diagram showing a current path of a current adjusting circuit of FIG. 1. FIG. 15 is a diagram showing a first example of the charging path of the battery pack when one battery is bypassed, and FIG. 16 is a diagram showing a second example of the charging path of the battery pack when one battery is bypassed. FIG. 17 is a diagram showing a power supply device with two batteries. FIG. 18 is a diagram showing currents and a battery pack voltage of a power supply device of a comparative example, and FIG. 19 is a diagram showing currents and the battery pack voltage of the power supply device according to Embodiment 1. FIG. 20 is a diagram showing a configuration of another power supply device according to Embodiment 1.

The power supply device 80 according to Embodiment 1 comprises a battery pack 50 provided with a plurality of batteries B1 to Bn, a capacitor 1 connected in parallel to the battery pack 50, a charging circuit 20 for charging the battery pack 50, an information detector 30 for outputting state detection information sig1 containing voltages and temperatures of the batteries B1 to Bn and the capacitor 1 in the battery pack 50, a battery pack control circuit 40 for outputting a path control signal sig2 and a current adjusting circuit control signal sig3 that are control signals for controlling the battery pack 50 and the current adjusting circuit 70, and a current adjusting circuit 70 for adjusting a current flowing from the capacitor 1 to a positive side of the battery pack 50. The battery pack 50 includes a plurality of power storage units BU1 to BUn each having a battery and two switching devices. The power storage unit BU1 includes a battery B1 and two switching devices Su1 and Sl1. The power storage unit BU2 includes a battery B2 and two switching devices Su2 and Sl2, and the power storage unit BUn includes a battery Bn and two switching devices Sun and Sln. The battery pack 50 has a configuration in which the plurality of power storage units BU1 to BUn are connected in series. FIG. 1 shows an example of the battery pack 50 in which n pieces of the power storage units are connected in series. Note that, in FIG. 1, three power storage units BU1, BU2, and BUn are specifically shown.

The power supply device 80 is provided with voltage sensors 35s1 to 35sn for detecting voltage information of the batteries and temperature sensors 36s1 to 36sn for detecting temperature information of the batteries for the respective power storage units, a voltage sensor 37 for detecting a voltage of the capacitor 1, and a temperature sensor 38 for detecting temperature information of the capacitor 1. The voltage sensor 35s1 and the temperature sensor 36s1 detect voltage information and temperature information of the battery B1 in the power storage unit BU1, respectively. The voltage sensor 35s2 and the temperature sensor 36s2 detect voltage information and temperature information of the battery B2 in the power storage unit BU2, respectively, and the voltage sensor 35sn and the temperature sensor 36sn detect voltage information and temperature information of the battery Bn in the power storage unit BUn, respectively. Note that the voltage sensors 35s1, 35s2, and 35sn and the temperature sensors 36s1, 36s2, and 36sn, which correspond to the respective three power storage units BU1, BU2, and BUn, are specifically shown in FIG. 1.

Each of the power storage units BU1, BU2 and BUn has a positive side terminal serving as a first terminal and a negative side terminal serving as a second terminal. The power storage unit BU1 has a positive side terminal 51p1 and a negative side terminal 51m1. The power storage unit BU2 has a positive side terminal 51p2 and a negative side terminal 51m2, and the power storage unit BUn has a positive side terminal 51pn and a negative side terminal 51mn. The positive side terminal 51p1 of the power storage unit BU1 is connected to a positive side terminal 81p of the power supply device 80 by a positive side wire 82p. The negative side terminal 51mn of the power storage unit BUn is connected to a negative side terminal 81m of the power supply device 80 by a negative side wire 82m. The positive side terminal of the battery pack 50 is the positive side terminal 51p1, and the negative side terminal of the battery pack 50 is the negative side terminal 51mn. The power storage unit of the power supply device 80 is appropriately denoted by an ordinal number in order from the unit adjacent to the positive side terminal 81p of the power supply device 80. The power storage unit BU1 connected to the positive side terminal 81p of the power supply device 80 is also referred to as a first power storage unit BU1, the power storage unit BU2 connected to the negative side terminal 51m1 of the power storage unit BU1 is also referred to as a second power storage unit BU2, and the power storage unit BUn connected to the negative side terminal 81m of the power supply device 80 is also referred to as an n-th power storage unit BUn. The first power storage unit BU1 is also the uppermost power storage unit, and the n-th power storage unit BUn is also the lowermost power storage unit.

An intermediate power storage unit connected between the first power storage unit BU1 and the n-th power storage unit BUn has a positive side terminal connected to a negative side terminal of an adjacent upper power storage unit and a negative side terminal connected to a positive side terminal of an adjacent lower power storage unit. In the second power storage unit BU2, the positive side terminal 51p2 is connected to the negative side terminal 51m1 of the first power storage unit BU1, and the negative side terminal 51m2 is connected to the positive side terminal of a third power storage unit (not shown), namely, an adjacent lower power storage unit. The positive side terminal 51pn of the n-th power storage unit BUn is connected to the negative side terminal of the (n−1)th power storage unit (not shown), namely, an adjacent upper power storage unit, and the negative side terminal 51mn of the n-th power storage unit BUn is connected to the negative side terminal 81m of the power supply device 80 with the negative side wire 82m.

In the first power storage unit BU1, which is the uppermost power storage unit, a connection point c1 of the switching devices Su1 and Sl1 connected in series is connected to the positive side terminal 51p1. The switching device Su1 is connected to the connection point c1 and the positive side of the battery B1, and the switching device Sl1 is connected to the connection point c1 and the negative side of the battery B1 and the negative side terminal 51m1. The first power storage unit BU1 has a path for charging and discharging the battery B1 as a first path, namely, the path connected from the positive side terminal 51p1 to the positive side of the battery B1, and a path for bypassing the battery B1 as a second path, namely, the path connected from the positive side terminal 51p1 to the negative side of the battery B1 and the negative side terminal 51m1. The selection between the path for charging and discharging the battery B1 and the path for bypassing the battery B1 is determined by an ON/OFF state of the switching devices Su1 and Sl1. When the path for charging and discharging the battery B1 is to be selected, the switching device Su1 is turned on and the switching device Sl1 is turned off. When the path for bypassing the battery B1 is to be selected, the switching device Su1 is turned off and the switching device Sl1 is turned on.

In the n-th power storage unit BUn, which is the lowermost power storage unit, a connection point cn of switching devices Sun and Sln connected in series is connected to the positive side terminal 51pn. The switching device Sun is connected to the connection point cn and the positive side of the battery Bn, and the switching device Sln is connected to the connection point cn and the negative side of the battery Bn and the negative side terminal 51mn. The n-th power storage unit BUn has a path for charging and discharging the battery Bn as a first path, namely, the path connected to the positive side of the battery Bn from the positive side terminal 51pn, and a path for bypassing the battery Bn as a second path, that is, the path connected to the negative side of the battery Bn and the negative side terminal 51mn from the positive side terminal 51pn. The selection between the path for charging and discharging the battery Bn and the path for bypassing the battery Bn is determined by the ON/OFF state of the switching devices Sun and Sln. When the path for charging and discharging the battery Bn is to be selected, the switching device Sun is turned on and the switching device Sln is turned off. When the path for bypassing the battery Bn is to be selected, the switching device Sun is turned off and the switching device Sln is turned on.

In the second power storage unit BU2, which is an intermediate power storage unit, a connection point c2 of the switching devices Su2 and Sl2 connected in series is connected to the positive side terminal 51p2. The switching device Su2 is connected to the connection point c2 and the positive side of the battery B2, and the switching device Sl2 is connected to the connection point c2 and the negative side of the battery B2 and the negative side terminal 51m2. The second power storage unit BU2 has a path for charging and discharging the battery B2 as a first path, namely, the path connected from the positive side terminal 51p2 to the positive side of the battery B2, and a path for bypassing the battery B2 as a second path, namely, the path connected from the positive side terminal 51p2 to the negative side of the battery B2 and the negative side terminal 51m2. The selection between the path for charging and discharging the battery B2 and the path for bypassing the battery B2 is determined by the ON/OFF state of the switching devices Su2 and Sl2. When the path for charging and discharging the battery B2 is to be selected, the switching device Su2 is turned on and the switching device Sl2 is turned off When the path for bypassing the battery B2 is to be selected, the switching device Su2 is turned off and the switching device Sl2 is turned on. The intermediate power storage unit (not shown) is configured in the same manner as the second power storage unit BU2.

The capacitor 1 is connected in parallel to both ends of the battery pack 50. More specifically, one end of the capacitor 1 is connected to the positive side wire 82p connected to the positive side terminal 51p1 of the battery pack 50 and the positive side terminal 81p of the power supply device 80, and the other end of the capacitor 1 is connected to the negative side wire 82m connected to the negative side terminal 51mn of the battery pack 50 and the negative side terminal 81m of the power supply device 80. By connecting the capacitor 1 in parallel with the battery pack 50, there is an effect for suppressing a pulsating current flowing through the battery pack 50. Generally, the battery pack and the capacitor are connected in parallel.

The current adjusting circuit 70 is, for example, a power consumption circuit 10 that consumes power of the capacitor 1. The power consumption circuit 10 adjusts a discharge current of the capacitor 1. The power consumption circuit 10 is connected in parallel with the capacitor 1. The power consumption circuit 10 includes a load 11 such as a resistor connected in series and a switching device Sc. The switching device Sc controls a flow and a cutoff of a current to the load 11. In the power consumption circuit 10, the switching device Sc is normally controlled to be in an OFF state, and the switching device Sc is to be controlled to be in an ON state when the power of the capacitor 1 is to be consumed. When the switching device Sc is in the OFF state, the load 11 is disabled. When the switching device Sc is turned to be in the ON state, the load 11 is enabled, and a current flows from the capacitor 1 to the load 11, so that the discharge from the capacitor 1 is enabled. In other words, when the switching device Sc is in the OFF state, the load 11 is disabled and the power consumption of the capacitor 1 does not occur. When the switching device Sc is in the ON state, the load 11 is enabled and the power consumption of the capacitor 1 occurs. FIG. 1 shows an example in which the load 11 is the resistor.

The charging circuit 20 is connected to the battery pack 50. More specifically, an output terminal 26p on the positive side of the charging circuit 20 is connected to the positive side wire 82p connected to the positive side terminal 51p1 of the battery pack 50 and the positive side terminal 81p of the power supply device 80, and an output terminal 26m on the negative side of the charging circuit 20 is connected to the negative side wire 82m connected to the negative side terminal 51mn of the battery pack 50 and the negative side terminal 81m of the power supply device 80. A positive side input terminal 25p of the charging circuit 20 is connected to a positive side power supply line 83p, and a negative input terminal 25m of the charging circuit 20 is connected to a negative side power supply line 83m. The charging circuit 20 controls input power inputted via the positive side power supply line 83p and the negative side power supply line 83m to charge the battery pack 50 to a predetermined voltage, that is, a predetermined set voltage.

The information detector 30 detects the voltage and temperature of each of the batteries B1 to Bn of the battery pack 50 and the voltage and temperature of the capacitor 1 from the voltage information output from the voltage sensors 35s1 to 35sn and the voltage sensor 37 and from the temperature information output from the temperature sensors 36s1 to 36sn and the temperature sensor 38, and outputs these voltages and temperatures as state detection information sig1. The battery pack control circuit 40 outputs device control signals sigs1u to sigsnu and sigs1l to sigsnl for controlling ON/OFF state of the switching devices Su1 to Sun and Sl1 to Sln of the battery pack 50 as a path control signal sig2 based on the state detection information sig1 output from the information detector 30, and outputs a current adjusting circuit control signal sig3 for controlling the load 11 of the current adjusting circuit 70 to be enabled and disabled. On the basis of the state detection information sig1, the battery pack control circuit 40 controls opening/closing of the first path, opening/closing of the second path in the power storage units BU1, BU2, and BUn, and the current adjusting circuit 70. Specifically, when the load 11 of the current adjusting circuit 70 is to be enabled, the current adjusting circuit control signal sig3 for turning on the switching device Sc of the current adjusting circuit 70, namely, the current adjusting circuit control signal sig3 for an instruction of the ON of the switching device Sc of the current adjusting circuit 70, is output. When the load 11 of the current adjusting circuit 70 is to be disabled, the current adjusting circuit control signal sig3 for turning off the switching device Sc of the current adjusting circuit 70, namely, the current adjusting circuit control signal sig3 for an instruction of the OFF of the switching device Sc, is output. Hereinafter, the configuration and an operation of the power supply device 80 according to Embodiment 1 will be described in detail.

The battery pack 50 includes the plurality of batteries B1 to Bn. The batteries B1 to Bn are, for example, secondary batteries such as lithium-ion batteries and nickel metal hydride batteries. As the type of shape of the secondary battery to be adopted in Embodiment 1, various types such as a cylindrical type, a rectangular type, and a laminated type can be adopted.

Each of the power storage units BU1 to BUn has two switching devices Su* and Sl*. Note that "*" indicates the last part in the symbol of the power storage unit. As described above, the power storage unit BU1 has two switching devices Su1 and Sl1, the power storage unit BU2 has two switching devices Su2 and Sl2, and the power storage unit BUn has two switching devices Sun and Sln. As the switching devices of the power storage units BU1 to BUn, a semiconductor switching device such as a Metal Oxide Semiconductor Field-Effect Transistor (MOSFET) and an Insulated Gate Bipolar Transistor (IGBT) is used. As the switching device Sc of the current adjusting circuit 70, the semiconductor switching device such as a MOSFET or an IGBT is also used. In an example shown in FIG. 1, MOSFETs are used for the switching devices Su1 to Sun, switching devices Sl1 to Sln, and switching device Sc. The switching devices Su1 to Sun each have a drain terminal d, a source terminal s, and a gate terminal g, and the same is applied to the switching devices Sl1 to Sln and the switching device Sc. The switching devices Su1 to Sun each have a MOS transistors M and a diode D, the same is applied to the switching devices Sl1 to Sln and the switching device Sc. The diode D may be a separate device from the MOS transistor M or a parasitic diode.

In the uppermost power storage unit BU1, the drain terminal d of the switching device Su1 is connected to the positive side of the battery B1, and the source terminal s of the switching device Su1 is connected to the drain terminal d of the switching device Sl1. The source terminal s of the switching device Sl1 is connected to the negative side terminal 51m1 of the battery B1. The connection point between the source terminal s of the switching device Su1 and the drain terminal d of the switching device Sl1 is the connection point c1. In the intermediate power storage unit BU2, the drain terminal d of the switching device Su2 is connected to the positive side of the battery B2, and the source terminal s of the switching device Su2 is connected to the drain terminal d of the switching device Sl2. The source terminal s of the switching device Sl2 is connected to the negative side terminal 51m2 of the battery B2. The connection point between the source terminal s of the switching device Su2 and the drain terminal d of the switching device Sl2 is the connection point c2. In the lowermost power storage unit BUn, the drain terminal d of the switching device Sun is connected to the positive side of the battery Bn, and the source terminal s of the switching device Sun is connected to the drain terminal d of the switching device Sln. The source terminal s of the switching device Sln is connected to the negative side terminal 51mn of the battery Bn. The connection point between the source terminal s of the switching device Sun and the drain terminal d of the switching device Sln is the connection point cn.

The power consumption circuit 10 includes the switching device Sc and the load 11. The switching device Sc is turned to the ON state when the power of the capacitor 1 is to be consumed by the current adjusting circuit control signal sig3 output from the battery pack control circuit 40. The current adjusting circuit control signal sig3 is input to the gate terminal g of the switching device Sc. When the current adjusting circuit control signal sig3 is at a high level, the switching device Sc is turned on, and when the current adjusting circuit control signal sig3 is at a low level, the switching device Sc is turned off. Although the resistor is shown as the simplest example of the load 11, the load 11 is not limited to the resistor. The load 11 may have any configuration as long as it can consume the electric power of the capacitor 1.

As shown in FIG. 2, the charging circuit 20 includes an input circuit 21, a voltage conversion circuit 22, an output circuit 23, and a charge control circuit 24. The input circuit 21 detects an input voltage from the outside, namely, a voltage between the input terminal 25p and the input terminal 25m. The voltage conversion circuit 22 converts the input voltage to the predetermined voltage, namely, the set voltage. The output circuit 23 outputs from the output terminals 26p and 26m, electric power having a voltage converted by the voltage conversion circuit 22. The charge control circuit 24 operates the voltage conversion circuit 22 until the battery pack 50 reaches the set voltage, which is the predetermined voltage, on the basis of the battery voltages V1 to Vn of the batteries B1 to Bn of the battery pack 50 from the state detection information sig1. When it is determined that the voltage of the battery pack 50 reaches the set voltage, the charge control circuit 24 stops the operation of the voltage conversion circuit 22.

As shown in FIG. 3, the information detector 30 includes an input circuit 33 and an output circuit 34. FIG. 3 also shows a voltage measuring instrument 31 for outputting battery voltage information sigvb1 to sigvbn and capacitor voltage information sigvc input to the input circuit 33, and a temperature measuring instrument 32 for outputting battery temperature information sigtb1 to sigtbn and capacitor temperature information sigtc input to the input circuit 33. The voltage measuring instrument 31 includes the voltage sensor 35s1 to 35sn for detecting voltage information of the batteries B1 to Bn, and the voltage sensor 37 for detecting voltage information of the capacitor 1. The temperature measuring instrument 32 includes the temperature sensor 36s1 to 36sn for detecting temperature information of the batteries B1 to Bn, and the temperature sensor 38 for detecting the temperature information of the capacitor 1. The temperature sensors 36s1 to 36sn and the temperature sensor 38 are, for example, thermistors.

The voltage sensor 35s1 outputs battery voltage information sigvb1, which is the voltage information of the battery B1. The voltage sensor 35s2 outputs battery voltage information sigvb2, which is the voltage information of the battery B2, and the voltage sensor 35sn outputs battery voltage information sigvbn, which is the voltage information of the battery Bn. The voltage sensor 37 outputs capacitor voltage information sigvc, which is the voltage information of the capacitor 1. The temperature sensor 36s1 outputs battery temperature information sigtb1, which is the temperature information of the battery B1. The temperature sensor 36s2 outputs battery temperature information sigtb2, which is the temperature information of the battery B2, and the temperature sensor 36sn outputs battery temperature information sigtbn, which is the temperature information of the battery Bn. The temperature sensor 38 outputs capacitor temperature information sigtc, which is the temperature information of the capacitor 1.

The battery voltage information sigvb1 to sigvbn are, for example, analog signals and are converted into digital signals indicating specific voltage values by the input circuit 33. Further, the capacitor voltage information sigvc is, for example, an analog signal and is converted into a digital signal indicating a specific voltage value by the input circuit 33. The input circuit 33 converts the battery voltage information sigvb1 into a battery voltage V1 of the battery B1. The input circuit 33 converts the battery voltage information sigvb2 into a battery voltage V2 of the battery B2 and converts the battery voltage information sigvbn into a battery voltage Vn of the battery Bn. In addition, the input circuit 33 converts the capacitor voltage information sigvc into a capacitor voltage Vc of the capacitor 1.

The battery temperature information sigtb1 to sigtbn are, for example, analog signals and are converted into digital signals indicating specific temperature values by the input circuit 33. Further, the capacitor temperature information sigtc is, for example, an analog signal and is converted into a digital signal indicating a specific temperature value by the input circuit 33. The input circuit 33 converts the battery temperature information sigtb1 into a battery temperature TM1 of the battery B1. The input circuit 33 converts the battery temperature information sigtb2 into a battery temperature TM2 of the battery B2 and converts the battery temperature information sigtbn into a battery temperature TMn of the battery Bn. In addition, the input circuit 33 converts the capacitor temperature information sigtc into a capacitor temperature TMc of the capacitor 1.

The output circuit 34 outputs the battery voltages V1 to Vn, the capacitor voltage Vc, the battery temperatures TM1 to TMn, and the capacitor temperature TMc as the state detection information sig1. That is, the state detection information sig1 contains information on the battery voltages V1 to Vn, information on the capacitor voltage Vc, information on the battery temperatures TM1 to TMn, and information on the capacitor temperature TMc.

As shown in FIG. 4, the battery pack control circuit 40 includes an input circuit 41, a switching control circuit 42, and an output circuit 43. The state detection information sig1 output from the output circuit 34 of the information detector 30 is input to the input circuit 41. On the basis of the information output from the input circuit 41, the switching control circuit 42 performs the selections of the path selection signals sigp1 to sigpn for selecting paths of the power storage units BU1 to BUn and the selection of discharge control of the capacitor 1 and outputs current adjusting selection signal sig11 for adjusting the current of the capacitor 1. The information output from the input circuit 41 contains information on the battery voltages V1 to Vn, information on the capacitor voltage Vc, information on the battery temperatures TM1 to TMn, and information on the capacitor temperature TMc. Further, the switching control circuit 42 outputs bypass permission signals sigb1 to sigbn for permitting changes in the paths of the power storage units BU1 to BUn to bypass paths. Specifically, the signal for selecting the path of the power storage unit BU2 is the path selection signal sigp2. The signal for permitting the change of the path of the power storage unit BU2 to the bypass path is the bypass permission signal sigb2.

The output circuit 43 outputs device control signals sigs1$u$ to sigsn$u$ for controlling the ON/OFF states of the switching devices Su1 to Sun and device control signals sigs1$l$ to sigsn$l$ for controlling the ON/OFF states of the switching devices Sl1 to Sln on the basis of the path selection signals sigp1 to sigpn and the bypass permission signals sigb1 to sigbn for the permission output from the switching control circuit 42. On the basis of the current adjusting selection signal sig11 output from the switching control circuit 42, the output circuit 43 outputs the current adjusting circuit control signal sig3 for controlling the ON/OFF state of the switching device Sc.

For example, when the path selection signal sigp1 is at the low level, the path for charging and discharging the power storage unit BU1 is selected, and when the path selection signal sigp1 is at the high level, the path for bypassing the power storage unit BU1 is selected. Similarly, when the path selection signal sigp2 is at the low level, the path for charging and discharging the power storage unit BU2 is selected, and when the path selection signal sigp2 is at the high level, the path for bypassing the power storage unit BU2 is selected. When the path selection signal sigpn is at the low level, the path for charging and discharging the power storage unit BUn is selected, and when the path selection signal sigpn is at the high level, the path for bypassing the power storage unit BUn is selected. When the current adjusting selection signal sig11 is at the high level, discharge of the capacitor 1 is selected. That is, when the current adjusting selection signal sig11 is at the high level, current adjustment is selected. When the current adjusting selection signal sig11 is at the low level, a state not to discharge, namely, a non-discharge state is selected. That is, when the current adjusting selection signal sig11 is at the low level, the current adjustment is not selected. Note that the bypass path is to be actually formed when a bypass permission condition described later is satisfied.

The power supply device 80 of Embodiment 1 turns off a positive side device, namely, a switching device Su*, of a power storage unit having a bypass target battery Bb when bypassing the bypass target battery Bb during the charging operation, and turns on a negative side device, namely, a switching device Sl*, of the power storage unit when the bypass permission condition is satisfied. "*" is any number from 1 to n. In the following description, symbols with "*" will be used for devices, signals, and the like corresponding to the power storage unit BU* as appropriate. For example, when the battery B1 is the bypass target battery Bb and a bypass permission signal sigb1 is at the high level, the change to the bypass path is permitted, and when the bypass permission signal sigb1 is at the low level, the change to the bypass path is not permitted. FIG. 5 shows an example of the output circuit 43 set in the manner described above. First, circuits for generating device control signals sigs1$u$ and sigs1$l$ for the power storage unit BU1 will be described. The output circuit 43 includes an inverting circuit bufi1 for outputting a device control signal sigs1$u$ for the power storage unit BU1 on the basis of the path selection signal sigp1. The output circuit 43 further includes an AND gate circuit bufa1 for outputting sigs1$l$ on the basis of the path selection signal sigp1 and the bypass permission signal sigb1.

The device control signals sigs1$u$ and sigs1$l$ for controlling the switching devices Su1 and Sl1 of the power storage unit BU1 are generated by the inverting circuit bufi1 and the AND gate circuit bufa1. The path selection signal sigp1 is inputted to the inverting circuit bufi1, and the inverting circuit bufi1 generates a signal in which the potential level (high level or low level) of the path selection signal sigp1 is inverted, and outputs it as the device control signal sigs1$u$. The path selection signal sigp1 and the bypass permission signal sigb1 are input to the AND gate circuit bufa1. The AND gate circuit bufa1 generates a signal in which the potential level (high level or low level) of the path selection signal sigp1 is not changed when the bypass permission signal sigb1 is at the high level, and outputs the signal as the device control signal sigs1$l$. The AND gate circuit bufa1 generates a low-level signal regardless of the potential level (high level or low level) of the path selection signal sigp1 when the bypass permission signal sigb1 is at the low level, and outputs the device control signal sigs1$l$ at the low level. In other words, when the bypass permission signal sigb1 is at the low level, even if the bypass path is selected with the path selection signal sigp1 being at the high level, the permission of the bypass path is not established, and the positive side device, namely, Su1, is turned to the OFF state, but the negative side device, namely, Sl1, remains in the OFF state. It can also be said that the bypass permission signal sigb1 controls the time from the OFF state of the positive side device Su1 to the ON state of the negative side device Sl1. Note that the high level and the low level in the device control signals sigs1$u$ and sigs1$l$ are the potential levels that enable the switching devices Su1 and Sl1 to be turned on and off. The low level may be at a negative potential.

The output circuit 43 includes inverting circuits bufi2 to bufin for outputting device control signals sigs2$u$ to sigsn$u$ for the power storage units BU2 to BUn, respectively, on the basis of the path selection signals sigp2 to sigpn. The output circuit 43 further includes AND gate circuits bufa2 to bufan for outputting sigs2$l$ to sigsn$l$ on the basis of the path selection signals sigp2 to sigpn and the bypass permission signals sigb2 to sigbn. In addition, the output circuit 43 includes a buffer circuit buf for generating the current adjusting circuit control signal sig3 to control the switching device Sc of the current adjusting circuit 70. The current adjusting selection signal sig11 is inputted to the buffer circuit buf, and a signal in which the potential level (high level or low level) of the current adjusting selection signal sig1l is not changed is generated and outputted as the current adjusting circuit control signal sig3. The operations for generating the device control signals sigs2u and sigs2l and the operations for generating the device control signals sigsnu and sigsnl are similar to the operations for generating the device control signals sigslu and sigs1l. Note that the high level and the low level in the device control signals sigs2u to sigsnu and sigs2l to sigsnl are potential levels that enable the switching devices Su2 to Sun and S12 to Sln to be turned on and off. The low level may be at a negative potential.

The device control signals sigs1u to sigsnu are input to gate terminals g of the switching devices Su1 to Sun, respectively. The device control signals sigs1l to sigsnl are input to gate terminals g of the switching devices S11 to Sln, respectively. The current adjusting circuit control signal sig3 is input to the gate terminal g of the switching device Sc. In FIG. 1, the intermediate power storage unit BU2 is specifically shown together with the power storage units BU1 and BUn. The device control signals sigs2u and sigs2l are input to the gate terminals g of the switching devices Su2 and S12 of the power storage unit BU2 shown specifically in FIG. 1. When the device control signals sigs1u to sigsnu are at the high level, corresponding respective switching devices Su1 to Sun are turned on, and when the device control signals sigs1u to sigsnu are at the low level, corresponding respective switching devices Su1 to Sun are turned off. When the device control signals sigs1l to sigsnl are at the high level, corresponding respective switching devices S11 to Sln are turned on, and when the device control signals sigs1l to sigsnl are at the low level, corresponding respective switching devices S11 to Sln are turned off. When the current adjusting circuit control signal sig3 is at the high level, the switching device Sc is turned on, and when the current adjusting circuit control signal sig3 is at the low level, the switching device Sc is turned off.

Note that the function of the charge control circuit 24 of the charging circuit 20, the functions of the input circuit 33 and the output circuit 34 in the information detector 30, and the functions of the input circuit 41 and the switching control circuit 42 in the battery pack control circuit 40 may be implemented by a processor 108 and a memory 109 shown in FIG. 6. In this case, the charge control circuit 24, the input circuit 33 and the output circuit 34 in the information detector 30, the input circuit 41 and the switching control circuit 42 in the battery pack control circuit 40 are implemented by the processor 108 executing a program stored in the memory 109. Each of the charging circuit 20, the information detector 30, and the battery pack control circuit 40 may be provided with the processor 108 and the memory 109. Further, a plurality of processors 108 and a plurality of memories 109 may cooperate to perform each of the functions.

The charging operation of the power supply device 80 according to Embodiment 1 will be described with reference to FIG. 7 to FIG. 16. FIG. 7 and FIG. 8 show a first example and a second example of the charging path of the battery pack 50, respectively. In the first example of the charging path of the battery pack 50 shown in FIG. 7, the switching devices Su1 to Sun are in the ON state, the switching devices S11 to Sln are in the OFF state, and the batteries B1 to Bn are charged via the MOS transistors M of the switching devices Su1 to Sun. In FIG. 7, a current path 72a passing through the power storage unit BU1, a current path 72b passing through the power storage unit BU2, and a current path 72c passing through the power storage unit BUn are specifically shown. The charging path of the first example is a path including current paths 72a, 72b, and 72c. Further, in the second example of the charging path of the battery pack 50 shown in FIG. 8, the switching devices Su1 to Sun are in the OFF state, the switching devices S11 to Sln are in the OFF state, and the batteries B1 to Bn are charged via the diodes D of the switching devices Su1 to Sun. In FIG. 8, a current path 73a passing through the power storage unit BU1, a current path 73b passing through the power storage unit BU2, and a current path 73c passing through the power storage unit BUn are specifically shown. The charging path of the second example includes current paths 73a, 73b, and 73c. In the first example shown in FIG. 7, the charging circuit 20 and all the batteries B1 to Bn are connected via the MOS transistors M of the switching devices Su1 to Sun. In the second example shown in FIG. 8, the charging circuit 20 and all the batteries B1 to Bn are connected via the diodes D of the switching devices Su1 to Sun.

FIG. 9 shows a discharging path when the battery pack 50 is discharged. The switching devices Su1 to Sun are in the ON state, the switching devices S11 to Sln are in the OFF state, and a current is discharged via MOS transistors M of the switching devices Su1 to Sun. FIG. 9 specifically shows a current path 74a for discharging a current from the battery B1 of the power storage unit BU1, a current path 74b for discharging a current from the battery B2 of the power storage unit BU2, a current path 74c for discharging a current from the battery Bn of the power storage unit BUn, and a current path 74d through which a current flows to the negative side of the battery Bn.

Here, the battery voltages, which are voltages of the batteries B1 and B2 to Bn, are V1 and V2 to Vn, respectively. The battery currents, which are currents of the batteries B1 and B2 to Bn are referred to as I1 and I2 to In, respectively. The capacitor voltage, which is the voltage of the capacitor 1, is Vc, and the capacitor current, which is the current of the capacitor 1, is Ic. The battery voltage V1 and V2 to Vn, and the capacitor voltage Vc are defined to be positive in the direction from the negative side wire 82m to the positive side wire 82p. The battery currents I1 and I2 to In are defined to be positive in the direction in which the currents flow from the positive sides of the batteries B1 to Bn, that is, in the discharge direction. The capacitor current Ic is defined to be positive in the direction in which the current flows toward the positive side wire 82p, that is, in the discharge direction. When the battery pack voltage is referred to as Vbt, the battery pack voltage Vbt is a total voltage obtained by adding all of the battery voltages V1 to Vn and can be expressed by Equation (1).

$$Vbt = \sum_{i=1}^{n} Vi \quad (1)$$

The charging circuit 20 performs control for charging the battery pack 50 with a constant current until the battery pack voltage Vbt of the battery pack 50 reaches the predetermined voltage, namely, the set voltage. In step ST1, the battery pack control circuit 40 outputs the path control signal sig2 for forming the charging path of the first example or the second example, and the current adjusting circuit control signal sig3, and starts charging the power storage units BU1 to BUn. The battery pack control circuit 40 controls the switching devices Su1 to Sun, the switching devices S11 to Sln, and the switching device Sc so as to form the charging path of the first example shown in FIG. 7 or the charging path of the second example shown in FIG. 8. When the charging path is formed in step ST1, a charging current starts to flow into the battery pack 50. In the case of the charging path of the first example shown in FIG. 7, the path selection signal sigp* is at the low level and the bypass permission signal sigb* is at the low level. In the case of the charging path of the second example shown in FIG. 8, the path selection signal sigp* is at the high level and the bypass permission signal sigb* is at the low level. In step ST2, the information detector 30 measures the voltages of the batteries B1 to Bn, namely, the battery voltages V1 to Vn (first voltage measurement step). In step ST3, the battery pack control circuit 40 determines whether any of the batteries B1 to Bn have reached an upper limit voltage (upper limit voltage determination step). When any of the batteries have reached the upper limit voltage, the process proceeds to step ST4, and when all of the batteries B1 to Bn have not reached the upper limit voltage, the process returns to step ST2. The battery that has reached the upper limit voltage is the bypass target battery Bb.

In step ST4, the battery pack control circuit 40 turns off the switching device Su* that is the positive side device of the battery storage unit BU* of the battery having reached the upper limit voltage (battery positive side path closing step). When the battery pack control circuit 40 detects the battery that has reached the upper limit voltage among the batteries B1 to Bn on the basis of the state detection information sig1, the battery pack control circuit 40 closes the first path in the power storage unit BU* having the bypass target battery Bb being the battery that has reached the upper limit voltage among the batteries B1 to Bn. For example, in the case where the battery B1 has reached the upper limit voltage, "*" is 1. In this case, the bypass target battery Bb is the battery B1. On the basis of the state detection information sig1, the battery pack control circuit 40 determines whether any of the battery voltages V1 to Vn of the batteries B1 to Bn have reached the upper limit voltage by the switching control circuit 42 and sets the path selection signal sigp* for the power storage unit BU* of the battery that has reached the upper limit voltage to the high level. In the case of the charging path of the first example, step ST4 is executed. In the case of the charging path of the second example, since the switching device Su*, which is the positive side device, is in the OFF state, step ST4 is skipped and step ST5 is immediately executed.

In step ST5, the battery pack control circuit 40 controls the current adjusting circuit 70 to start a current discharge of the capacitor 1 by the current adjusting circuit 70 (capacitor discharge start step). The battery pack control circuit 40 controls the switching device Sc in the current adjusting circuit 70 to cause a current to flow through the load 11. In the capacitor discharge start step in step ST5, the switching device Sc of the power consumption circuit 10 is turned to the ON state, and the load 11 is enabled. When the load 11 is enabled, the current is discharged from the capacitor 1 to the negative wire 82m. Note that, in the capacitor discharge start step of step ST5, an adjustment of the capacitor current Ic by the current adjusting circuit 70 is started, it can also be called a capacitor current adjusting start step. FIG. 14 shows current paths when the switching device Sc of the current adjusting circuit 70 is in the ON state. Since the charging circuit 20 does not stop current supply, the current of the charging circuit 20 flows to the negative side wire 82m via the switching device Sc and the load 11 as shown by a current path 75a. Since the positive and negative sides of the capacitor 1 are connected by the switching device Sc and the load 11, the capacitor current Ic flows from the positive side to the negative side of the capacitor 1. As shown by a current path 75b, the capacitor current Ic flows from the positive side of the capacitor 1 to the negative side wire 82m via the switching device Sc and the load 11. Therefore, by turn the switching device Sc of the current adjusting circuit 70 to the ON state, the electric power stored in the capacitor 1 is consumed by the current adjusting circuit 70. As a result, the capacitor voltage Vc decreases.

Since the switching device Su* has the diode D, the battery B* is charged even when the switching device Su* is in the OFF state, and therefore, it is desirable that the capacitor discharge start step of step ST5 should be executed immediately after step ST4 is executed. Although an example is shown in which step ST5 is executed after step ST4 in FIG. 10, step ST4 and step ST5 may be executed at the same time.

In step ST6, the information detector 30 measures the battery voltages of the remaining batteries except for the bypass target battery Bb and the capacitor voltage Vc of the capacitor 1 (second voltage measurement step). When the bypass target battery Bb is the battery B1, the information detector 30 measures the battery voltages V2 to Vn of the batteries B2 to Bn and the capacitor voltage Vc of the capacitor 1 in the second voltage measurement step of step ST6. In step ST7, the battery pack control circuit 40 determines whether or not the capacitor voltage Vc is equal to or lower than the total voltage of the remaining batteries excluding the bypass target battery Bb, namely, a charging-continued battery pack voltage Vbs (charging-continued battery pack voltage determination step). For example, when the bypass target battery Bb is the battery B1, the charging-continued battery pack voltage Vbs is the sum of the battery voltages V2 to Vn. Here, if the voltage of the bypass target battery Bb is Vbb, Vbs can be expressed by Equation (2). The remaining battery pack excluding the bypass target battery Bb will be referred to as a charge-continued battery pack.

$$Vbs = Vbt - Vbb \tag{2}$$

When the number of pieces of the bypass target batteries Bb is m, the charging-continued battery pack voltage Vbs is a total voltage in which the bypass target batteries Bb of the number of pieces m are excluded and is expressed by Equation (3).

$$Vbs = \sum_{i}^{n-m} Vi \tag{3}$$

Note that the number of pieces of the batteries to be totaled is n−m, and i in the Equation (3) to be selected is a numeral excluding the numerals of the bypass target batteries Bb.

In step ST7, if the capacitor voltage Vc is equal to or lower than the charging-continued battery pack voltage Vbs, the process proceeds to step ST8, and if the capacitor voltage Vc is not equal to or lower than the charging-continued battery pack voltage Vbs, the process returns to step ST6. By executing step ST4, the capacitor voltage Vc is equal to the battery pack voltage Vbt calculated by Equation (1) at a time before step ST5 is executed. Therefore, in step ST7, when the capacitor voltage Vc is not equal to or lower than the charging-continued battery pack voltage Vbs, namely, when the voltage determination condition is not satisfied, the capacitor voltage Vc is not sufficiently low. In this case, the discharge of the capacitor 1 is continued, and the second voltage measurement step is executed at step ST6 after a certain period of time. Note that step ST7 shown in FIG. 12 may be executed depending on the relationship between the discharge speed of the capacitor 1 and the measurement interval time of the second voltage measurement step in step ST6. In step ST7, it is determined whether the capacitor voltage Vc is equal to the charging-continued battery pack voltage Vbs. In this case, "equal to" means that it is within an allowable range. For example, assuming that the width of an upper limit value and the width of a lower limit value in the allowable range are +ΔV and −ΔV, if the capacitor voltage Vc is within the range from Vbs+ΔV to Vbs−ΔV, the voltage determination condition of step ST7 is satisfied.

In step ST8, the battery pack control circuit 40 turns on the switching device Sl*, which is the negative side device of the power storage unit BU* of the battery having reached the upper limit voltage (bypass path opening step). The battery pack control circuit 40 opens the second path in the power storage unit BU* having the bypass target battery Bb. The battery pack control circuit 40 generates bypass permission signal sigb* of the high level and changes sigs*1 in the path control signal sig2 to the high level. Then, promptly in step ST9, the battery pack control circuit 40 controls the current adjusting circuit 70 to stop the discharge of the capacitor 1 by the current adjusting circuit 70 (capacitor discharge stop step). The battery pack control circuit 40 controls the switching device Sc to cut off the current flow to the load 11. In the capacitor discharge stop step in step ST9, the switching device Sc of the power consumption circuit 10 is turned to the OFF state, and the load 11 is made disabled. When the load 11 is disabled, the discharge from the capacitor 1 to the negative side wire 82*m* is stopped. Note that the capacitor discharge stop step in step ST9 can be referred to as a capacitor current adjusting stop step because the current adjusting circuit 70 stops the adjustment of the capacitor current Ic.

In the case where the bypass target battery Bb is the battery B1, a current flows from the batteries B2 to Bn to the current adjusting circuit 70 when both the switching device Sl1 and the switching device Sc are in the ON state, and the electric power stored in the battery pack 50 is consumed. Therefore, it is desirable to execute the capacitor discharge stop step of step ST9 promptly after the execution of step ST8. Note that, although step ST9 is executed after step ST8 in FIG. 10, step ST8 and step ST9 may be executed at the same time. In the case where step ST8 and step ST9 are executed at the same time, it is possible to suppress the consumption of the electric power stored in the battery pack 50 when the bypass target battery Bb is the battery B1.

Note that, if the switching device Sc is turned to the OFF state before turning the switching device Sl* to the ON state, which is a negative side element, the capacitor 1 is charged, and an unacceptable difference may occur between the capacitor voltage Vc and the voltage of the charging-continued battery pack, which is the voltage of the battery pack 50 excluding the bypass target battery Bb, namely, the charging-continued battery pack voltage Vbs. Therefore, as shown in FIG. 10, the capacitor discharge stop step of step ST9 is executed promptly after step ST8 is executed, or step ST8 and step ST9 are executed at the same time.

FIG. 15 and FIG. 16 show a first example and a second example for a charging path when the bypass target battery Bb is bypassed, respectively. FIG. 15 and FIG. 16 show cases where the bypass target battery Bb is the battery B1. In the charging path of the first example shown in FIG. 15, the batteries B2 to Bn are charged via the MOS transistors M of the switching devices Su2 to Sun. In FIG. 15, a current path 76*a* passing through the power storage unit BU1, a current path 76*b* passing through the power storage unit BU2, and a current path 76*c* passing through the power storage unit BUn are specifically shown. The charging path of the first example is a path including the current paths 76*a*, 76*b* and 76*c*. In the charging path of the second example shown in FIG. 16, the switching devices Su2 to Sun are in the OFF state, and the batteries B2 to Bn are charged via the diodes D of the switching devices Su2 to Sun. In FIG. 16, a current path 77*a* passing through the power storage unit BU1, a current path 77*b* passing through the power storage unit BU2, and a current path 77*c* passing through the power storage unit BUn are specifically described. The charging path of the second example is a path including the current paths 77*a*, 77*b*, and 77*c*.

In step ST10, the battery pack control circuit 40 determines whether the charging-continued battery pack voltage Vbs is a voltage indicating full charge (full charge determination step). When the charging-continued battery pack voltage Vbs is the voltage indicating the full charge, the charging is terminated, and when the charging-continued battery pack voltage Vbs is not the voltage indicating the full charge, the process returns to step ST2 to continue charging. By executing step ST1 to step ST10, the power supply device 80 of Embodiment 1 can continue charging such that a large current does not flow to the remaining batteries when the deteriorated battery or the like that reaches the upper limit voltage earlier than the other batteries is bypassed. The difference between a deteriorated battery and an undeteriorated and sound battery (healthy battery) is that the time required to reach the upper limit voltage during charging differs to each other. Note that, after the step ST2, if there is a battery that has reached the upper limit voltage, the battery is bypassed. Therefore, in the power supply device 80 of Embodiment 1, all the batteries B1 to Bn can be fully charged even if variations in the deterioration of the batteries B1 to Bn exist. Further, the power supply device 80 of Embodiment 1 is not limited to the case where a battery is deteriorated and can also bypass a battery even when the battery cannot be charged due to some failure.

Although the operation after completion of the charging differs depending on how the power supply device 80 is used, the bypass target battery Bb is usually connected in series with other batteries. That is, an operation for configuring the battery pack 50 to which the bypass target battery Bb is reconnected is performed. The reconnection operation for the bypassed battery will be described with reference to FIG. 11. There should be a difference between the battery pack voltage Vbt of the battery pack 50 after charging and the capacitor voltage Vc of the capacitor 1. Therefore, there is a possibility that a large current flows from the battery pack 50 to the capacitor 1 when the battery pack 50 in which all the batteries B1 to Bn are connected in series is reconnected between the positive side wire 82*p* and the negative side wire 82*m* without taking any measures. After charging all the batteries B1 to Bn, the power storage units BU1 to BUn of the battery pack 50 are disconnected from the positive side wire 82*p* and the negative side wire 82*m* in step ST11. Specifically, the battery pack control circuit 40 turns off the switching devices Su1 to Sun and the switching devices Sl1 to Sln. In step ST12, the information detector 30 measures the battery voltages V1 to Vn of the batteries B1 to Bn and the capacitor voltage Vc of the capacitor 1 (third voltage measurement step). Since the case where the bypassed battery exists is considered, the capacitor voltage Vc of the capacitor 1 is lower than the predetermined set voltage of the battery pack 50. At this time, the charging circuit 20 is in operation, so that the charging for the capacitor 1 is continued. Note that, if the charging circuit 20 is not in operation, the charging circuit 20 receives the state detection information sig1 at step ST12 to start the operation.

In step ST13, the battery pack control circuit 40 determines whether or not the capacitor voltage Vc is equal to or higher than the battery pack voltage Vbt, which is the total voltage of the batteries B1 to Bn (a reconnected battery pack voltage determination step). In step ST13, if the capacitor voltage Vc is equal to or higher than the battery pack voltage Vbt, the process proceeds to step ST15, and if the capacitor voltage Vc is not equal to or higher than the battery pack voltage Vbt, the process returns to step ST12 via step ST14. In step ST14, the charging circuit 20 charges the capacitor 1. Note that, step ST13 shown in FIG. 13 may be executed depending on the relationship between the charging speed of the capacitor 1 and the measurement interval time of the third voltage measurement step in step ST12. In step ST13, it is determined whether the capacitor voltage Vc is equal to the battery pack voltage Vbt. In this case, "equal to" means that it is within an allowable range. For example, assuming that the width of an upper limit value and the width of a lower limit value in the allowable range are +ΔV and −ΔV, if the capacitor voltage Vc is within the range from Vbt+ΔV to Vbt−ΔV, the voltage determination condition of step ST13 is satisfied.

In step ST15, the battery pack control circuit 40 turns the positive side devices, namely, the switching devices Su1 to Sun in the power storage units BU1 to BUn of the battery pack 50, to the ON state. By executing steps ST11 to ST15, the power supply device 80 of Embodiment 1 can reconnect the battery pack 50 provided with the deteriorated battery, etc. to the positive side wire 82p and the negative side wire 82m without passing a large current from the battery pack 50 to the capacitor 1.

Note that the bypass target battery Bb is a battery that reaches the upper limit voltage in a shorter period of time and is a deteriorated battery. Since the internal resistance of the deteriorated battery is increased, the deteriorated battery reaches the upper limit voltage faster than other batteries. Therefore, it is easy to detect the full charge of the deteriorated battery, namely, the reaching of the upper limit voltage. Further, since the deteriorated battery has a high internal resistance, the amount of heat generated owing to the internal resistance increases more than that of a sound battery. Therefore, it is possible to estimate the presence or absence of deterioration by measuring the battery temperature since the deteriorated battery has a higher temperature than the battery that has not deteriorated, namely, a sound battery. Further, if the battery pack control circuit 40 has temperature dependency of the internal resistance of batteries in use in a form of, for example, a look-up table, the temperature distribution occurring in the battery pack is considered, and then the deteriorated battery can be more accurately estimated by interpolating the temperature with respect to the internal resistance. In this case, in step ST2, the information detector 30 measures the temperatures of the batteries B1 to Bn, namely, the battery temperatures TM1 to TMn together with the battery voltages V1 to Vn of the batteries B1 to Bn (device information measurement step). In step ST3, the battery pack control circuit 40 determines whether each of the batteries B1 to Bn has reached the upper limit voltage and determines whether the battery is deteriorated (deteriorated battery determination step).

An effectiveness of consuming surplus power of the capacitor 1 in the power supply device 80 according to Embodiment 1, namely, the effectiveness of adjusting the discharge current will be described. The power supply device 80 including the two power storage units BU1 and BU2 shown in FIG. 17 will be described as an example. FIG. 18 is the diagram showing currents and a battery pack voltage in the power supply device of the comparative example in which the discharge current of the capacitor 1 is not adjusted. FIG. 19 is the diagram showing currents and a battery voltage in the power supply device 80 according to Embodiment 1 in which the discharge current of the capacitor 1 is adjusted. The battery pack 50 includes batteries B1 and B2 connected in series. FIG. 18 shows a current characteristic 91a of the battery B1, a current characteristic 91b of the battery B2, a current characteristic 91c of the load 11 of the current adjusting circuit 70, a current characteristic 91d of the capacitor 1, and a voltage characteristic 92 of the battery pack 50. In FIG. 18, the horizontal axis represents time. In FIG. 18, the vertical axes of the current characteristics 91a, 91b, 91c, and 91d represent the battery current I1, the battery current I2, the load current Ir, and the capacitor current Ic, respectively. In FIG. 18, the vertical axis of the voltage characteristic 92 represents the battery pack voltage Vbt. FIG. 19 shows a current characteristic 93a of the battery B1, a current characteristic 93b of the battery B2, a current characteristic 93c of the load 11 of the current adjusting circuit 70, a current characteristic 93d of the capacitor 1, and a voltage characteristic 94 of the battery pack 50. In FIG. 19, the horizontal axis represents time. In FIG. 19, the vertical axes of the current characteristics 93a, 93b, 93c, and 93d represent the battery current I1, the battery current I2, the load current Ir, and the capacitor current Ic, respectively. In FIG. 19, the vertical axis of the voltage characteristic 94 represents the battery pack voltage Vbt.

First, the currents and the battery pack voltage Vbt in the power supply device of the comparative example will be described. At a time t10, switching devices Su1 and Su2 are in the ON state, switching devices Sl1 and Sl2 are in the OFF state, and batteries B1 and B2 are being charged. The battery current I1 of the battery B1 has a current value of −i1, and the battery current I2 of the battery B2 has a current value of −i2. Since the charging is in operation, the direction of the battery currents I1 and I2 is negative. Since the switching device Sc of the current adjusting circuit 70 is in the OFF state, the current value of the load current Ir is 0 (zero). The capacitor current Ic of the capacitor 1 has a current value of −i3. Since the charging is in operation, the direction of the capacitor current Ic is negative. The battery pack voltage Vbt has a voltage value of Va.

At a time t11, in order to bypass the battery B1, the switching device Su1 was turned to the OFF state and the switching device Sl1 was turned to the ON state. At the time t11, the battery current I1 becomes 0, the battery current I2 becomes −i2a, and the capacitor current Ic becomes i3a. In addition, the battery pack voltage Vbt decreases to a voltage value of V2. Since the switching device Sc of the current adjusting circuit 70 is in the OFF state, the current value of the load current Ir is 0. In FIG. 18, after the time t11, an elapsed time up to a time t12 is shown.

From the current characteristic 91a of the battery B1, the current at the time t11 is 0, and from the voltage characteristic 92 of the battery pack 50, the voltage is decreased at the time t11, indicating that the bypass route has been changed. However, from the current characteristic 91b of the battery B2, it can be seen that a large current flows instantaneously at the time t11 when the battery B1 is bypassed. Furthermore, from the current characteristic 91d of the capacitor 1, it can be seen that the capacitor 1 is discharged with a large current at the time t11. This is because the voltage of the capacitor 1 connected in parallel with the battery pack 50 becomes higher than that of the battery pack 50, so that the electric power stored in the capacitor 1 flows to the battery pack 50. Since the switching device Sc in the path through which the current is caused to flow through the load 11 is constantly kept in the OFF state, the load current Ir does not flow. Therefore, at the instant when the path is changed to a path for bypassing the deteriorated battery (battery B1) of the bypass target while the power of the capacitor 1 exceeds stored power of the battery B2, which is the battery to be continuously charged, a large current flows from the capacitor 1 to the remaining battery, namely, the battery B2.

Next, the currents and the battery pack voltage Vbt in the power supply device 80 according to Embodiment 1 will be described. At a time t0, the switching devices Su1 and Su2 are in the ON state, the switching devices Sl1 and Sl2 are in the OFF state, and the batteries B1 and B2 are being charged. The time t0 corresponds to the time t10 in FIG. 18. The battery current I1 of the battery B1 has a current value of −i1, and the battery current I2 of the battery B2 has a current value of −i2. Since the charging is in operation, the direction of the battery currents I1 and I2 is negative. Since the switching device Sc of the current adjusting circuit 70 is in the OFF state, the current value of the load current Ir is 0. The capacitor current Ic of the capacitor 1 has a current value of −i3. Since the charging is in operation, the direction of the capacitor current Ic is negative. The battery pack voltage Vbt has a voltage value of Va.

In FIG. 19, the switching device Su1 connected to the positive side of the battery B1 is changed to the OFF state at a time t1. The switching device Sc of the current adjusting circuit 70 is turned on at a time t2, the switching device Sl1 is turned on at a time t4, and the switching device Sc is turned off at a time t5. In FIG. 19, after the time t5, an elapsed time up to a time t6 is shown. The operations at the times t1, t2, t4 and t5 correspond to the operations at steps ST4, ST5, ST8, and ST9 shown in FIG. 10, respectively. Note that the time t4 and the time t5 corresponding to the operations of steps ST8 and ST9 are intentionally delayed. At the time t1, the switching device Su1 connected to the positive side of the battery B1 is turned to the OFF state, but since the switching device Su1 is provided with the diode D, the current remains flowing to the battery B1.

Subsequently, by turning the switching device Sc to the ON state at the time t2, the battery current I1 of the battery B1 becomes 0, the battery current I2 of the battery B2 becomes 0, the capacitor current Ic of the capacitor 1 becomes i3b, and the load current Ir of the load 11 becomes i4a. The battery voltage Vbt tends to decrease from the voltage value of Va. At the time t2, a current starts flowing to the load 11 in order to discharge the power of the capacitor 1. Note that, in the case where the power of the capacitor 1 is consumed up to the time t5, the capacitor current Ic remains flowing at the current value i3b, and no current is supplied from the charging circuit 20. At the time t3, the battery current I2 of the battery B2 has a current value i2b, and the current flows from the battery B2 to the load 11. The load current Ir flowing through the load 11 is the sum of the battery current I2 flowing from the battery B2 to the load 11 and the capacitor current Ic flowing from the capacitor 1 to the load 11. Since the current value of the battery current I2 is 0 from the time t2 to the time t3, the current value i3b of the capacitor current Ic matches the current value of the load current Ir. From the time t3 to the time t5, the current value i3b of the capacitor current Ic becomes i4−i2b. In FIG. 19, the current value of the capacitor current Ic from the time t2 to the time t3 and the current value of the capacitor current Ic from the time t3 to the time t5 may be different in the case as described above, but they are set to the same current value i3b. The current value −i3 of the capacitor current Ic is close to 0.

At the time t4, the switching device Sl1 is turned to the ON state. At this time, in the case where the battery voltage V2 of the battery B2 is higher than the capacitor voltage Vc of the capacitor 1, the current is discharged from the battery B2 to the load 11 regardless of the ON state or the OFF state of the switching device Sl1. That is, the diode D of the switching device Sl1 causes a discharge current to flow even when the switching device Sl1 is not turned to the ON state. From the time t3 to the time t4 in the current characteristic 93b, discharge by the diode D is shown. From the time t4 to the time t5 in the current characteristic 93b, discharge by the MOS transistor M is shown. When the switching device Sc is turned to the OFF state at the time t5, the battery current I2 of the battery B2 becomes −i2, the capacitor current Ic of the capacitor 1 becomes −i3, and the load current Ir of the load 11 becomes 0. By turning the switching device Sc to the OFF state at the time t5, the change to a path bypassing the battery B1 can be made without a large current flowing through the battery B2 by the series of the control actions. In the voltage characteristic 94 shown in FIG. 19, although the battery voltage V2 of the battery B2 decreases in the case where the period from the time t3 to the time t5 is long, the voltage is shown as being constant. Note that, by adjusting the resistance value of the load 11, it is possible to reduce the decrease in the battery voltage V2 of the battery B2 during the period from the time t3 to the time t5.

By changing the switching device Sc to the OFF state at the time t5, the change to the path bypassing the battery B1 can be made without a large current flowing through the battery B2 by the series of the control actions. However, from the time after the discharge of the capacitor 1 in which the battery pack voltage Vbt is made equal to the capacitor voltage Vc between the time t2 and the time t3, and up to the time until the switching device Sl1 is turned to the ON state and the switching device Sc is turned to the OFF state, namely, in the period between the time t3 and the time t5, a current flows from the battery B2 to the load 11. This means that the electric power stored in the battery B2 is consumed, leading to a decrease in charging efficiency. Therefore, as described in step ST8 and step ST9 of FIG. 10, it is desirable that the time from the time t3 to the time t5 be as close to 0 as possible. That is, when the capacitor 1 finishes discharging and the capacitor voltage Vc becomes equal to the voltage of the battery pack excluding the deteriorated battery (bypass target battery), the optimum control is to turn on the switching device for the path bypassing the deteriorated battery and to promptly turn off the switching device Sc of the current adjusting circuit 70.

In the power supply device 80 of Embodiment 1, when the capacitor voltage Vc of the capacitor 1 becomes equal to or lower than the total voltage of the charging-continued battery pack that are the remaining batteries after the bypass target battery Bb is excluded, namely, the charging-continued battery pack voltage Vbs, the switching device Sl*, which is the negative side device of the power storage unit having the bypass target battery Bb, is turned to the ON state, so that a large current does not flow through the charging-continued battery pack and the path can be changed to a path for bypassing the bypass target battery Bb that has reached the upper limit voltage earlier due to the degradation or the like. As a result, the power supply device 80 of Embodiment 1 can continue to charge the battery pack 50 while avoiding degradation due to charging with a large current. Further, in the power supply device 80 of Embodiment 1, when the capacitor voltage Vc of the capacitor 1 becomes equal to the total voltage of the charging-continued battery pack that are the remaining batteries after the bypass target battery Bb is excluded, namely, the charging-continued battery pack voltage Vbs, the switching device Sl*, which is the negative side device of the power storage unit having the bypass target battery Bb, is turned to the ON state, so that the charging can be continued without lowering the charging efficiency while avoiding degradation due to the large current charging of the battery pack 50.

Up to now, an example has been described in which the switching devices Su* and Sl* of the power storage units BU1 to BUn and the switching device Sc of the current adjusting circuit include MOSFETs, but as described before, the switching devices Su* and Sl* and the switching device Sc may include IGBTs. In another power supply device 80 according to Embodiment 1 shown in FIG. 20, the switching devices Su1 to Sun and the switching devices Sl1 to Sln in the power storage units BU1 to BUn, and the switching device Sc of the current adjusting circuit 70 include IGBTs. Terminals in the switching devices Su1 to Sun, Sl1 to Sln, and Sc are a collector terminal c, an emitter terminal e, and a gate terminal g. The switching devices Su1 to Sun, the switching devices Sl1 to Sln, and the switching device Sc each include a transistor BT as an IGBT and a diode D. In this case, the drain terminal d, the source terminal s, and the MOS transistor M in the switching devices Su*, Sl* and the switching device Sc are respectively replaced with the collector terminal c, the emitter terminal e, and the transistor BT.

As described above, the power supply device 80 according to Embodiment 1 is provided with the plurality of power storage units BU1, BU2, and BUn having batteries B1, B2, and Bn, the first terminals (positive side terminals 51*p*1, 51*p*2, and 51*pn*), and the second terminals (negative side terminals 51*m*1, 51*m*2, and 51*mn*). The power supply device 80 is provided with: the battery pack 50 in which the plurality of power storage units BU1, BU2, and BUn having the first paths connecting the positive side of batteries B1, B2, and Bn and the first terminals (positive side terminals 51*p*1, 51*p*2, 51*pn*) and the second paths connecting the negative side of batteries B1, B2, and Bn and the second terminals (negative side terminals 51*m*1, 51*m*2, 51*mn*) and the first terminals (positive side terminals 51*p*1, 51*p*2, 51*pn*) are connected in series; the capacitor 1 connected in parallel with the battery pack 50; the charging circuit 20 for charging the battery pack 50; the current adjusting circuit 70 for adjusting the current flowing from the capacitor 1 to the positive side of the battery pack 50; the information detector 30 for outputting the state detection information sig1 containing the battery voltages V1, V2, and Vn of the batteries B1, B2, and Bn and the capacitor voltage Vc of the capacitor 1; and the battery pack control circuit 40 for controlling the opening/closing of the first path, the opening/closing of the second path in the power storage units BU1, BU2, and BUn, and the current adjusting circuit 70 on the basis of the state detection information sig1. The current adjusting circuit 70 includes the load 11 through which a current flows, and the switching device Sc for controlling the flow and the cutoff of the current to the load 11. When the battery pack control circuit 40 detects a battery B1, B2, or Bn that has reached the upper limit voltage on the basis of the state detection information sig1 during charging of the battery pack 50, the battery pack control circuit 40 closes the first path in the power storage unit BU1, BU2, or BUn including the bypass target battery Bb, which is the battery B1, B2, or Bn that has reached the upper limit voltage, and controls the switching device Sc in the current adjusting circuit 70 to cause a current to flow through the load 11. Thereafter, the battery pack control circuit 40 opens the second path in the power storage unit BU1, BU2, or Bun including the bypass target battery Bb, and then controls the switching device Sc to cut off the current flow to the load 11. With this configuration, when a battery having reached the upper limit voltage is detected, the power supply device 80 of Embodiment 1 adjusts the current flowing to the positive side of the battery pack 50 by passing a current through the load 11 of the current adjusting circuit 70 between the closing control of the first path and the opening control of the second path in the battery. As a result, the charging can be continued such that a large current does not flow to the remaining batteries when the deteriorated battery (bypass target battery Bb) that reaches the upper limit voltage earlier than other batteries is bypassed.

The battery pack charging method according to Embodiment 1 is a battery pack charging method in which the battery pack 50 is charged by the power supply device 80 including the battery pack 50, the battery pack 50 being provided with the plurality of power storage units BU1, BU2 and BUn connected in series that have the batteries B1, B2, and Bn, the first terminals (positive side terminal 51*p*1, 51*p*2 and 51*pn*) and the second terminals (negative side terminal 51*m*1, 51*m*2 and 51*mn*). The power storage units BU1, BU2, and BUn include the first paths connecting the positive sides of the batteries B1, B2, and Bn and the first terminals (positive side terminals 51*p*1, 51*p*2, 51*pn*), and the second paths connecting the negative sides of the batteries B1, B2, and Bn, the second terminals (negative side terminals 51*m*1, 51*m*2, 51*mn*), and the first terminals (positive side terminals 51*p*1, 51*p*2, 51*pn*). The power supply device 80 is provided with the capacitor 1 connected in parallel to the battery pack 50, and the current adjusting circuit 70 for adjusting the current flowing from the capacitor 1 to the positive side of the battery pack 50. The current adjusting circuit 70 includes the load 11 through which a current flows and the switching device Sc for controlling the flow and the cutoff of the current to the load 11. When charging the battery pack 50, the power supply device 80 executes: the voltage measurement step for measuring the battery voltages V1, V2, and Vn of the batteries B1, B2, and Bn; the upper limit voltage determination step for determining whether the battery voltages V1, V2, and Vn measured in the voltage measurement step have reached the upper limit voltage; a first path closing step for closing the first path in the power storage unit BU1, BU2, or BUn including the bypass target battery Bb, which is the battery B1, B2, or Bn that has reached the upper limit voltage in the case where the battery voltage V1, V2, or Vn has reached the upper limit voltage in the upper limit voltage determination step; and the capacitor current adjusting start step for controlling the switching device Sc in the current adjusting circuit 70 to cause a current to flow through the load 11. After the capacitor current adjusting start step, the power supply device 80 executes a second path opening step for opening the second path in the power storage unit BU1, BU2, or Bun including the bypass target battery Bb, and the capacitor current adjusting stop step for controlling the switching device Sc to cut off the current flow to the load 11. With this configuration, in the battery pack charging method of Embodiment 1, since the capacitor current adjusting start step for adjusting the current flowing to the positive side of the battery pack by causing a current to flow through the load of the current adjusting circuit is executed between the first path closing step for closing the first path and the second path opening step for opening the second path of the battery determined to have reached the upper limit voltage, it is possible to continue charging such that a large current does not flow in the remaining batteries when the deteriorated battery (bypass target battery Bb) that reaches the upper limit voltage earlier than other batteries is bypassed.

Embodiment 2

Figure 21:
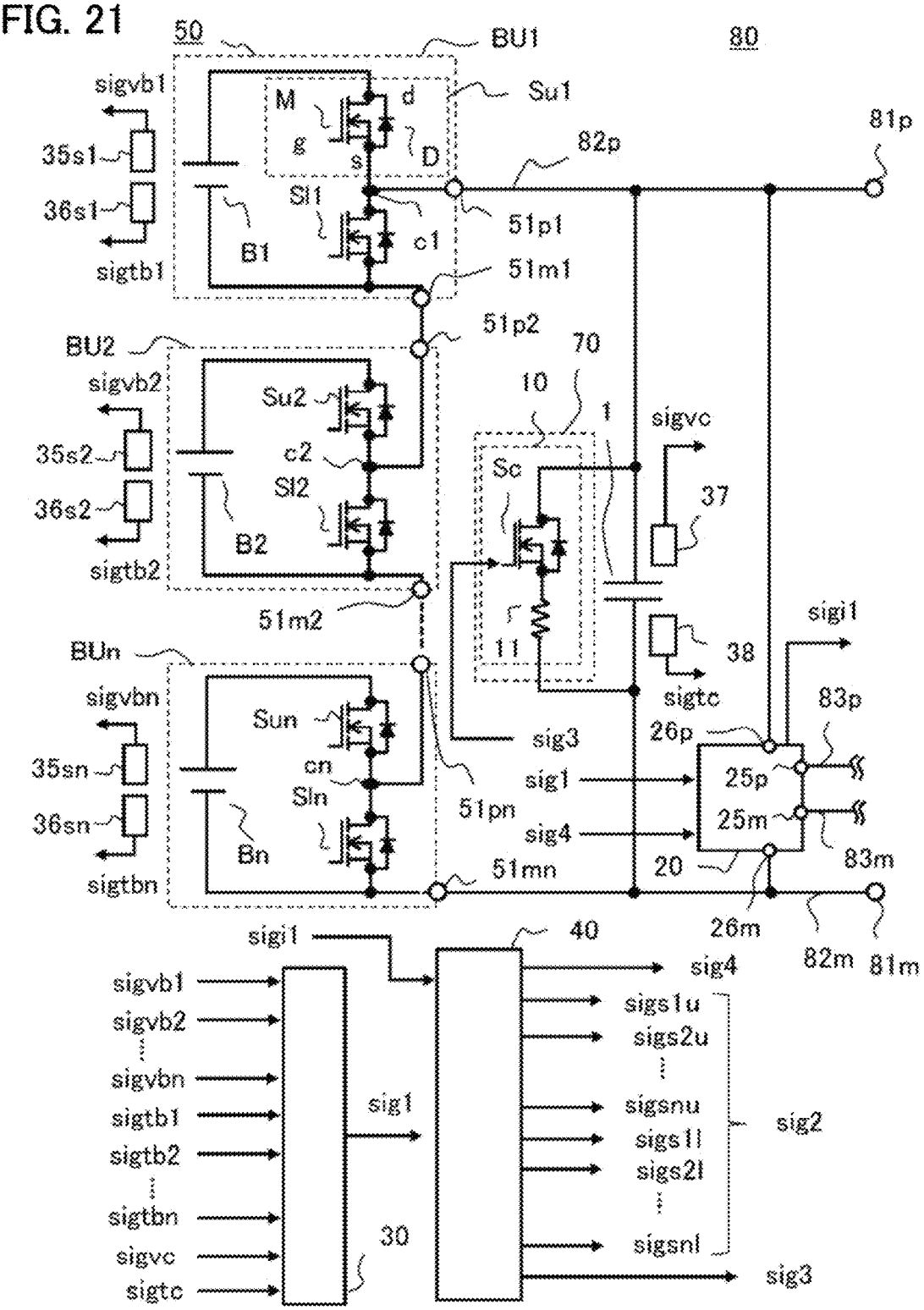
FIG. 21 is a diagram showing a configuration of a power supply device according to Embodiment 2.
Figure 22:
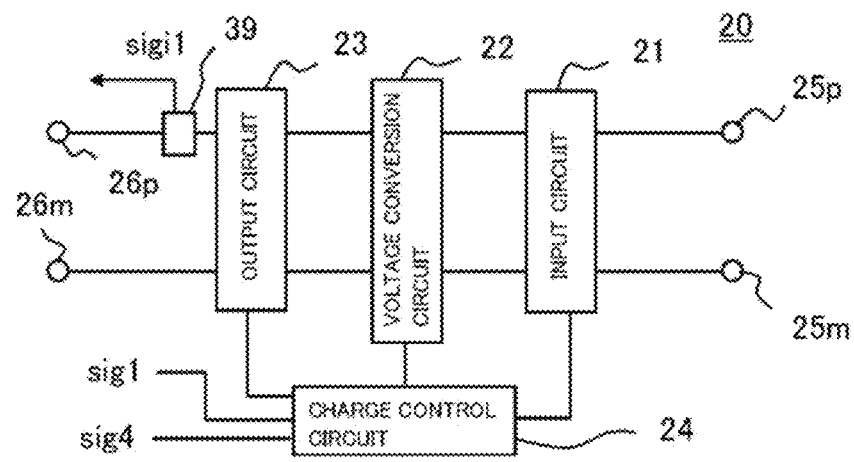
FIG. 22 is a diagram showing a configuration of a charging circuit of FIG. 21.
Figure 23:
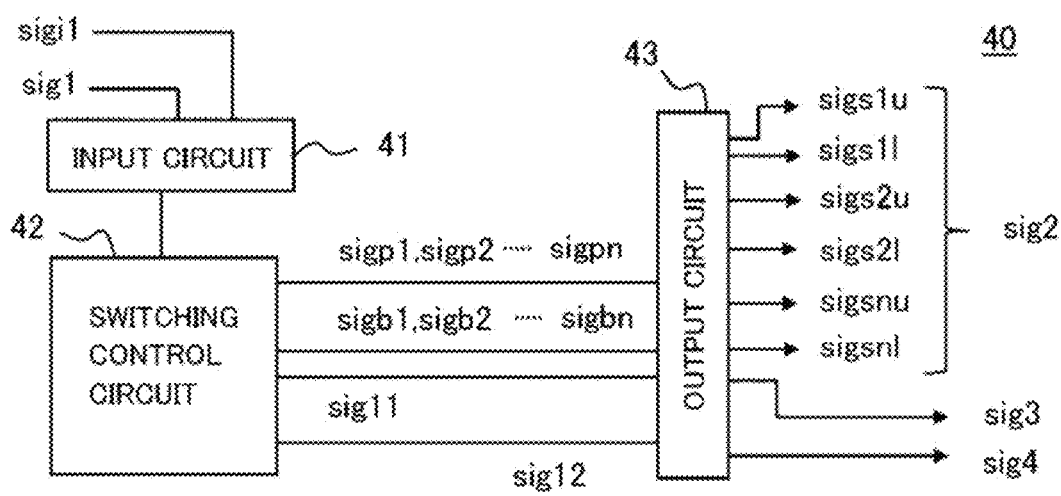
FIG. 23 is a diagram showing a configuration of a battery pack control circuit of FIG. 21.
Figure 24:
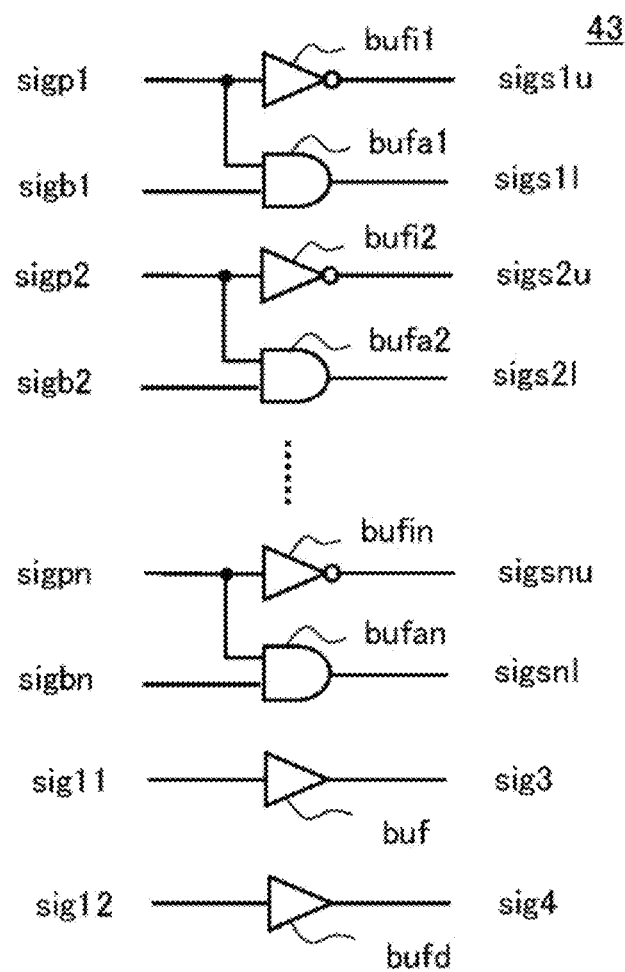
FIG. 24 is a diagram showing a configuration of an output circuit of FIG. 23.
Figure 25:
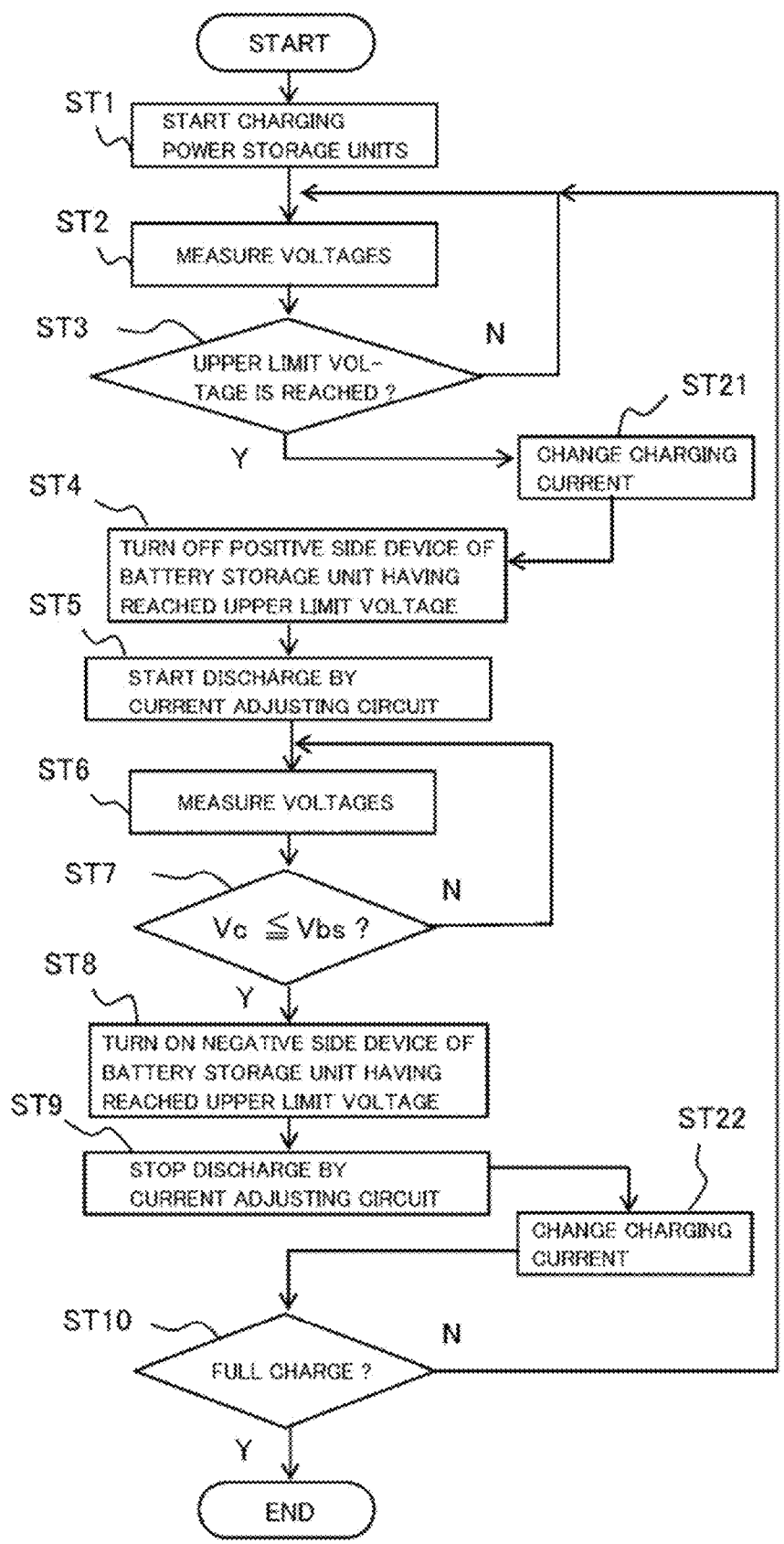
FIG. 25 is a flowchart explaining a charging operation of the power supply device according to Embodiment 2.

FIG. 21 is a diagram showing a configuration of a power supply device according to Embodiment 2, and FIG. 22 is a diagram showing a configuration of a charging circuit of FIG. 21. FIG. 23 is a diagram showing a configuration of a battery pack control circuit of FIG. 21, and FIG. 24 is a diagram showing a configuration of an output circuit of FIG. 23. FIG. 25 is a flowchart explaining a charging operation of the power supply device according to Embodiment 2. The power supply device 80 according to Embodiment 2 is different from the power supply device 80 according to Embodiment 1 in that the battery pack control circuit 40 outputs a charging current change command sig4 and the charging circuit 20 changes a charging current in accordance with the charging current change command sig4. A part different from the power supply device 80 of Embodiment 1 will be mainly described.

In Embodiment 1, the power consumption circuit 10 including the load 11 is shown as an example of the current adjusting circuit 70. In this case, depending on a relationship between the magnitude of the charging current supplied from the charging circuit 20 and the resistance value of the load 11, a charging current may flow through the battery pack 50 while the current adjusting circuit 70 operates to consume the surplus power of the capacitor 1. In the case where the charging current flows for a long period of time through a bypass target battery Bb, which is a deteriorated battery that has reached the upper limit voltage or a failed battery, there is a possibility of overcharging. Therefore, after the upper limit voltage determination step in step ST3, a step of changing the charging current, specifically, a step of lowering the charging current is added. In addition, after the capacitor discharge stop step in step ST9, a step of changing the charging current, specifically, a step of restoring the charging current to its original value, is added. The charging current change command sig4 is output from the output circuit 43 of the battery pack control circuit 40. The charging circuit 20 includes a current sensor 39, and charging current information sigi1 output from the current sensor 39 is input to the battery pack control circuit 40. The battery pack control circuit 40 generates the path control signal sig2 on the basis of the charging current information sigi1 and the state detection information sig1 output from the information detector 30.

The battery pack control circuit 40 of Embodiment 2 shown in FIG. 23 differs from the battery pack control circuit 40 of Embodiment 1 shown in FIG. 4 in two respects. The first difference is that the switching control circuit 42 outputs a full charge signal sig12 when any of the batteries of the battery pack 50 are fully charged, and the output circuit 43 outputs the charging current change command sig4 on the basis of the full charge signal sig12. The second difference is that the switching control circuit 42 adjusts a change timing of the path selection signals sigp1 to sigpn on the basis of the charging current information sigi1. In a case where a battery is fully charged, the case corresponds to the case where the battery has reached the upper limit voltage. For example, the full charge signal sig12 is at a low level when all the batteries B1 to Bn of the battery pack 50 are not fully charged and is at a high level when any of the batteries of the battery pack 50 are fully charged. As shown in FIG. 24, the output circuit 43 of the battery pack control circuit 40 according to Embodiment 2 includes a buffer circuit bufd for generating the charging current change command sig4. The full charge signal sig12 is input to the buffer circuit bufd, and a signal in which the potential level (high level or low level) of the full charge signal sig12 is not changed is generated and is output as the charging current change command sig4.

The charge control circuit 24 of the charging circuit 20 receives the charging current change command sig4 together with the state detection information sig1. The charging current change command sig4 are a command to set the charging current to a charging current 1, which is a normal set charging current, when sig4 is at the low level, for example, and a command to set the charging current to a charging current 2, which is a set charging current lower than the charging current 1, when sig4 is at the high level. The charge control circuit 24 controls the voltage conversion circuit 22 so as to output the charging current corresponding to a current value of the charging current 1 or the charging current 2 on the basis of the charging current change command sig4. The operation of the charging circuit 20 according to Embodiment 2 other than changing the charging current is the same as that of the charging circuit 20 according to Embodiment 1.

The charging operation of the power supply device 80 according to Embodiment 2 will be described with reference to FIG. 25. The flowchart of FIG. 25 is different from the flowchart of FIG. 10 in that step ST21 and step ST22 are added. In step ST3, the battery pack control circuit 40 determines whether the batteries B1 to Bn have reached the upper limit voltage (upper limit voltage determination step). In step ST3, if any of the batteries have reached the upper limit voltage, the process proceeds to step ST21, and if all of the batteries B1 to Bn have not reached the upper limit voltage, the process returns to step ST2. The battery that has reached the upper limit voltage is the bypass target battery Bb. In step ST21, the current value of the charging current is changed to the current value of the charging current 2 (charging current lowering step).

In step ST21, the switching control circuit 42 outputs the full charge signal sig12 indicating the presence of the battery having reached the upper limit voltage. For example, when any of the batteries reached the upper limit voltage, namely, when an upper limit voltage determination condition is satisfied, the switching control circuit 42 outputs the full charge signal sig12 of the high level, namely, the full charge signal sig12 indicating that the upper limit voltage determination condition is satisfied. Upon receiving the full charge signal sig12 indicating that the upper limit voltage determination condition is satisfied, the output circuit 43 outputs the charging current change command sig4 indicating the command for changing the charging current to the charging current 2. When the battery pack control circuit 40 detects the battery (bypass target battery Bb) that has reached the upper limit voltage on the basis of the state detection information sig1, the battery pack control circuit 40 outputs the charging current change command sig4 for a decrease in the charging current supplied from the charging circuit 20. Upon receiving the charging current change command sig4 indicating the command for changing the charging current to the charging current 2, the charging circuit 20 changes the current value of the charging current to the current value of the charging current 2.

In step ST4, the battery pack control circuit 40 confirms that the charging current of the charging circuit 20 has decreased from the charging current 1 to the charging current 2 on the basis of the charging current information sigi1 in the switching control circuit 42, and then turns off the switching device Su* that is the positive side device of the power storage unit BU* of the battery having reached the upper limit voltage. Thereafter, step ST5 to step ST9 are executed. After executing the capacitor discharge stop step of step ST9, the process proceeds to step ST22. In step ST22, the current value of the charging current is changed to the current value of the charging current 1 (charging current restoring step).

In step ST22, the switching control circuit 42 of the battery pack control circuit 40 changes the full charge signal sig12 to the low level; that is, it resets the determination result of the upper limit voltage determination step. The battery pack control circuit 40 outputs the charging current change command sig4 indicating the command for changing the charging current to the charging current 1, from the output circuit 43. The battery pack control circuit 40 controls the current adjusting circuit 70 to cut off the current flow to the load 11, and then outputs the charging current change command sig4 for an increase in the charging current. Upon receiving the charging current change command sig4 indicating the command for changing the charging current to the charging current 1, the charging circuit 20 changes the current value of the charging current to the current value of the charging current 1. Thereafter, the full charge determination step in step ST10 is executed. In step ST10, if the charging-continued battery pack voltage Vbs is not a voltage indicating the full charge, the process returns to step ST2 to continue charging. In this case, charging of the charging-continued battery pack excluding the bypass target battery Bb is restarted.

The battery pack control circuit 40 outputs the charging current change command sig4 on the basis of the charging current information sigi1 and the capacitor voltage Vc. For example, when the charging current obtained from the charging current information sigi1 is larger than a predetermined determination current value and a decrease status of the capacitor voltage Vc is not satisfactory, the battery pack control circuit 40 outputs the charging current change command sig4 indicating the command for changing the charging current from the charging current 1 to the charging current 2. The decrease status of the capacitor voltage Vc corresponds to, for example, a speed of the decrease in the capacitor voltage Vc. Further, the battery pack control circuit 40 may output the charging current change command sig4 on the basis of the capacitor voltage Vc without using the charging current information sigi1.

Since the power supply device 80 of Embodiment 2 makes the charging current of the charging circuit 20 smaller than the normal charging current when bypassing the bypassing target battery Bb such as the deteriorated battery even if the charging current is larger or the resistance value of the load 11 is larger than that of the power supply device 80 of Embodiment 1, it is possible to prevent the charging current from flowing to the battery pack 50 while the current adjusting circuit 70 is in operation even if the resistance value of the load 11 of the current adjusting circuit 70 is large. That is, the power supply device 80 of Embodiment 2 can prevent the overcharging of the deteriorated battery when the bypass target battery Bb is a deteriorated battery, even if the charging current is larger or the resistance value of the load 11 is larger than that of the power supply device 80 of Embodiment 1. Further, since the power supply device 80 of Embodiment 2 is provided with the current adjusting circuit 70 as in the power supply device 80 of Embodiment 1, the power supply device 80 of Embodiment 2 consumes the surplus electric power of the capacitor 1 and then bypasses the bypass target battery Bb such as the deteriorated battery, so that the same effects as those of the power supply device 80 of Embodiment 1 are obtained.

Embodiment 3

Figure 26:
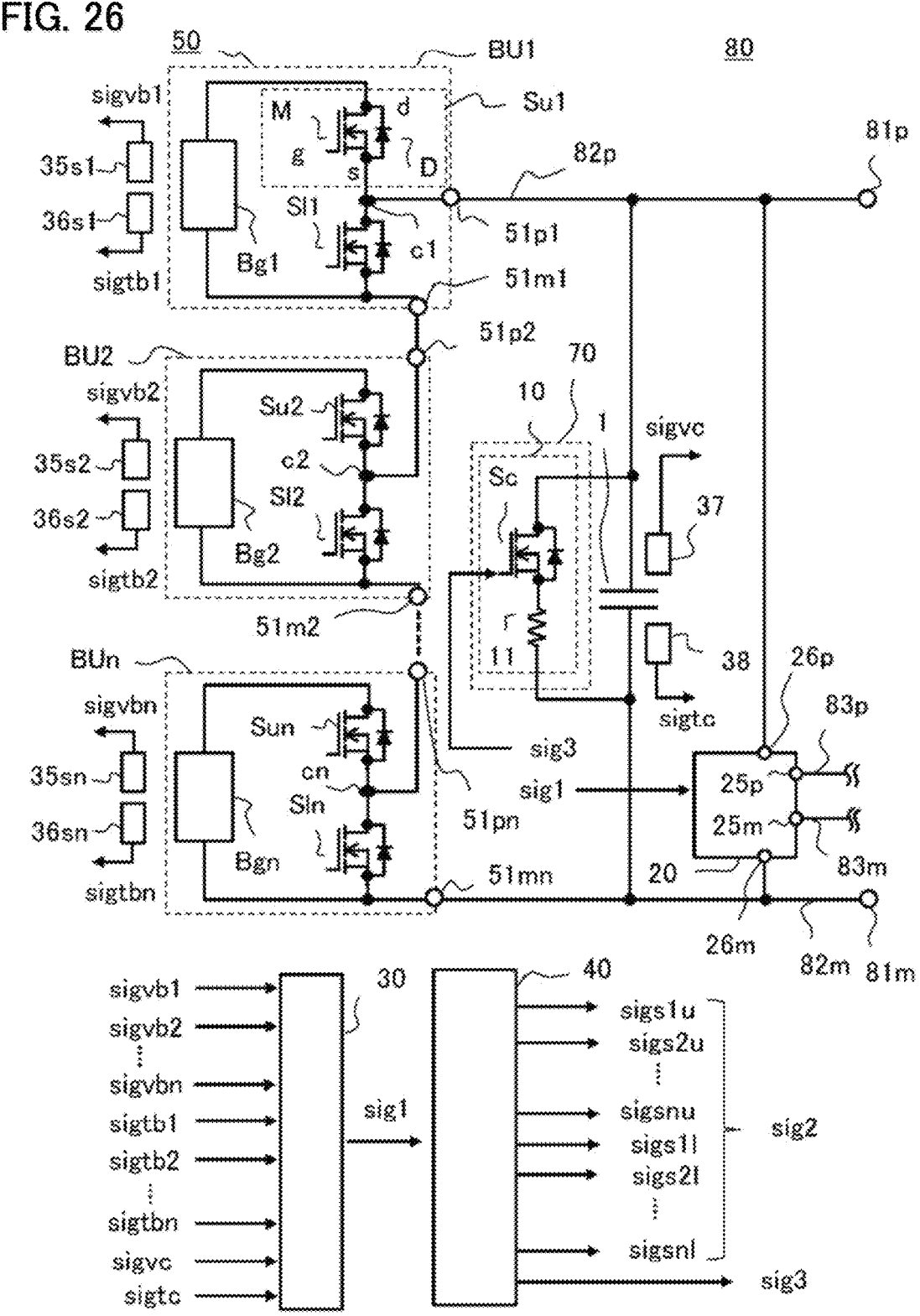
FIG. 26 is a diagram showing a configuration of a power supply device according to Embodiment 3.
Figure 27:
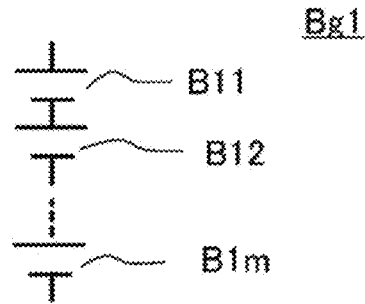
FIG. 27 shows a configuration of a battery group Bg1 of FIG. 26.
Figure 28:
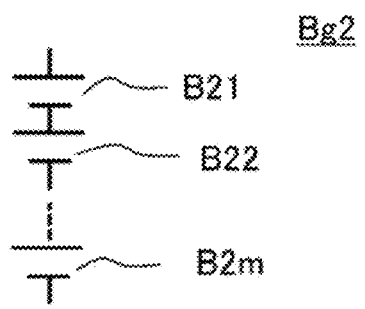
FIG. 28 shows a configuration of a battery group Bg2 of FIG. 26.
Figure 29:
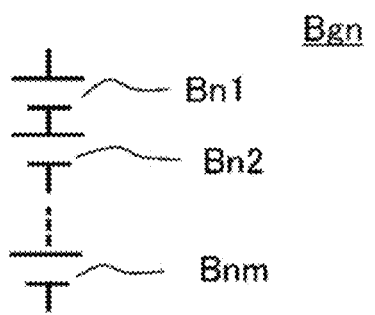
FIG. 29 shows a configuration of a battery group Bgn of FIG. 26.
Figure 30:
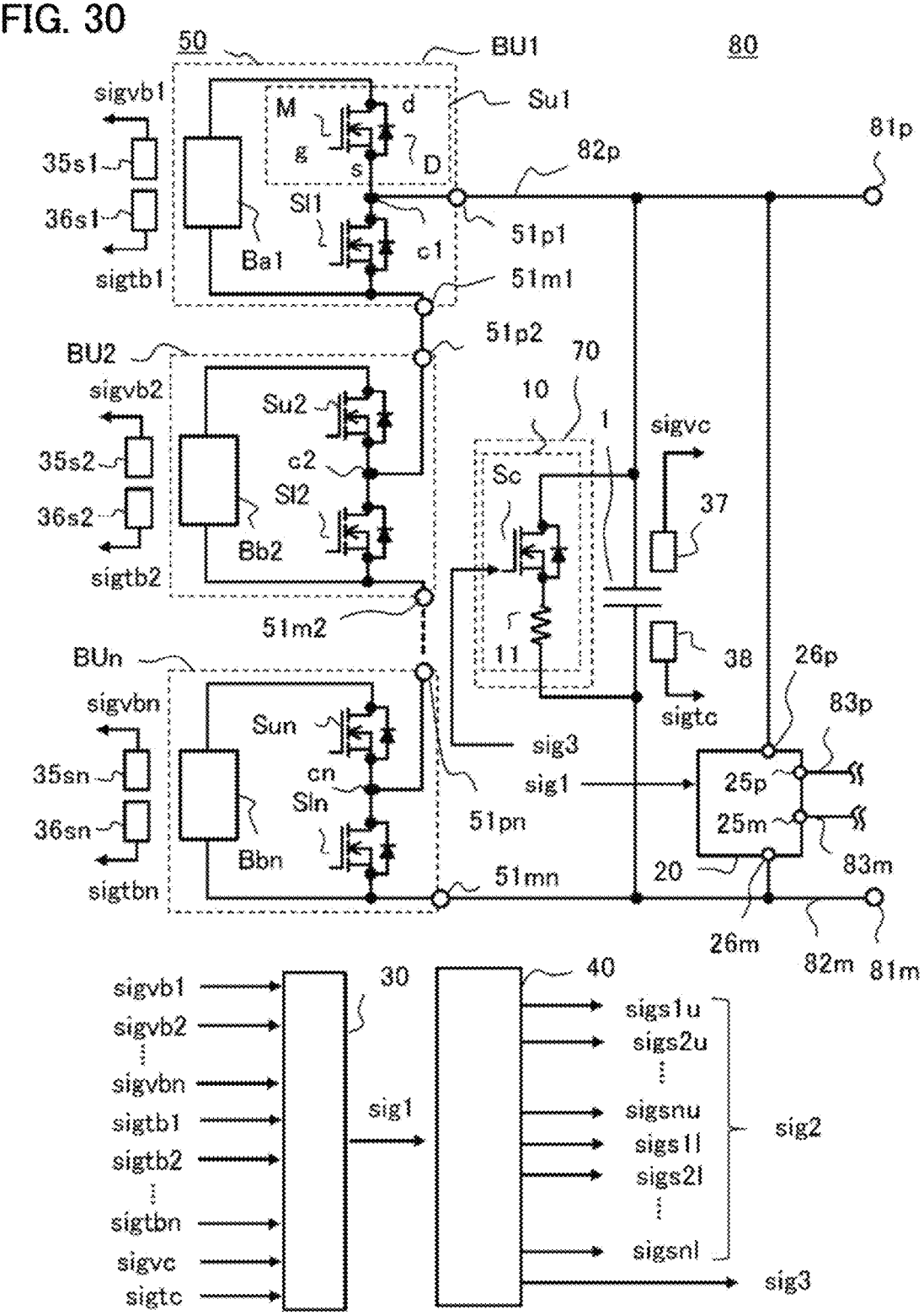
FIG. 30 is a diagram showing a configuration of another power supply device according to Embodiment 3.

FIG. 26 is a diagram showing a configuration of a power supply device according to Embodiment 3. FIG. 27, FIG. 28, and FIG. 29 show configurations of battery groups Bg1, Bg2, and Bgn shown in FIG. 26, respectively. FIG. 30 is a diagram showing a configuration of another power supply device according to Embodiment 3. The power supply device 80 of Embodiment 3 differs from the power supply device 80 of Embodiment 1 or Embodiment 2 in that the power storage units BU1 to BUn are provided with battery groups Bg1 to Bgn each of which has a plurality of batteries connected in series. FIG. 26 shows an example in which the battery groups Bg1 to Bgn are applied to the power supply device 80 of Embodiment 1. A part different from the power supply device 80 of Embodiment 1 will be mainly described.

In the battery group Bg1, m pieces of batteries B11 to B1$m$ are connected in series. In FIG. 27, the batteries B11, B12, and B1$m$ are specifically shown. Similarly, m pieces of batteries B21 to B2$m$ are connected in series in the battery group Bg2, and m pieces of batteries Bn1 to Bnm are connected in series in the battery group Bgn. In FIG. 28, the batteries B21, B22, and B2$m$ are specifically shown, and in FIG. 29, the batteries Bn1, Bn2, and Bnm are specifically shown.

Since each power storage unit has m pieces of the batteries (battery cells), and thus the battery pack 50 shown in FIG. 26 has m×n pieces of the batteries. By providing a large number of batteries, it is possible to charge and discharge electric power at a higher voltage than in the case of a small number of batteries. In this case, when a power storage unit is configured for each battery, the data amount of battery voltage information and battery temperature information of all batteries is enormous, and the number of wires for transmitting the path control signal sig2 is also enormous. Therefore, by providing each power storage unit with a battery group, it is possible to bypass a bypass target battery group Bgb, which is a deteriorated or failed battery group, with the same data amount and the operations as the power supply device 80 of Embodiment 1. The operation of the power supply device 80 according to Embodiment 3 is similar to that of the power supply device 80 according to Embodiment 1 if the batteries B1 to Bn are replaced with the battery groups Bg1 to Bbn and the bypass target battery Bb is replaced with the bypass target battery group Bgb. Therefore, the power supply device 80 of Embodiment 3 can be provided with the battery pack 50 in which a large number of batteries are connected in series without having a complicated configuration and can charge and discharge high voltage power.

Further, as in the power supply device 80 of Embodiment 3 shown in FIG. 30, a configuration in which a new battery and a deteriorated battery are used at the same time may be adopted. Specifically, the configuration may be adopted in which a deteriorated battery group Bal and new battery groups Bb2 to Bbn are provided. Note that the deteriorated battery group is referred to as Bal, but this does not limit the number of deteriorated battery groups. Further, only part of the deteriorated battery group Bal may have a deteriorated battery.

Although an example of detecting the battery voltage information and the battery temperature information for each of the power storage unit has been described so far, the power supply device 80 according to Embodiment 3 is not limited to this example. Although the amount of data is to be enormous, the power supply device 80 of Embodiment 3 may detect information of all batteries in each battery group, and the voltage measurement position and temperature measurement position thereof are not limited.

In the power supply device 80 of Embodiment 3, since one power storage unit is provided with a battery group in which a plurality of battery cells are connected, the power supply device 80 can be applied for general use. For example, an electric vehicle or the like uses a battery pack capable of charging and discharging high voltage power by connecting the plurality of battery cells in series. Therefore, the power supply device 80 of Embodiment 3 can also be applied to the electric vehicle or the like that uses high voltage power. Since the power supply device 80 of Embodiment 3 has a configuration in which a deteriorated battery and a new battery can be used, it is possible to reuse a battery that should have been discarded originally, thereby constructing a power supply system in which the cost of replacing a battery can be reduced.

The power supply device 80 according to Embodiment 3 is provided with the current adjusting circuit 70 as in the power supply device 80 according to Embodiment 1, and since the bypass target battery group Bgb such as the deteriorated battery group is bypassed after the surplus power of the capacitor 1 is consumed, the same effect as that of the power supply device 80 according to Embodiment 1 can be obtained. Furthermore, the battery groups Bg1 to Bgn of Embodiment 3 can also be applied to the power supply device 80 of Embodiment 2. The power supply device 80 of Embodiment 2 to which the battery groups Bg1 to Bgn are applied has the same effect as the power supply device 80 of Embodiment 2.

Embodiment 4

Figure 31:
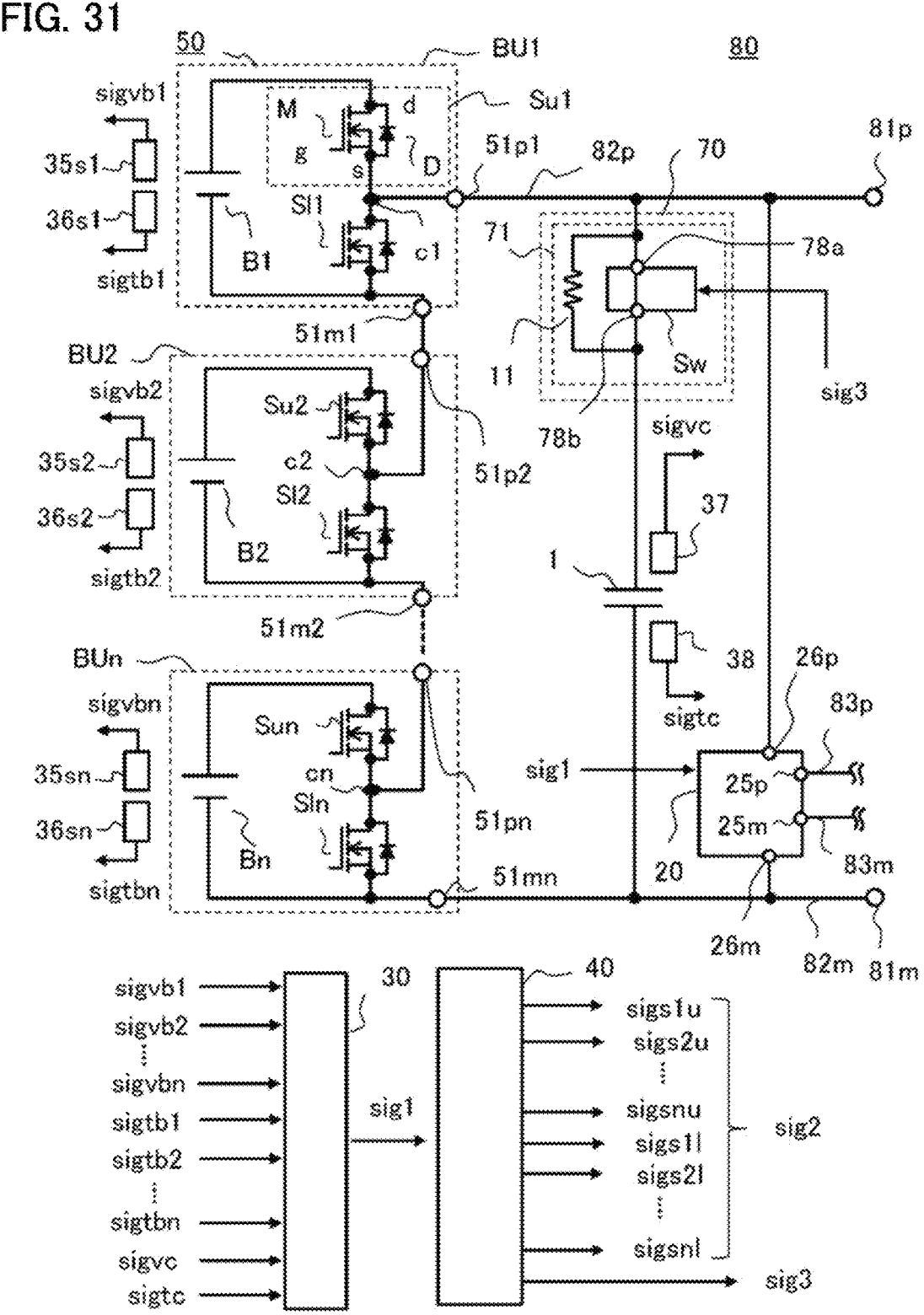
FIG. 31 is a diagram showing a configuration of a power supply device according to Embodiment 4.
Figure 32:
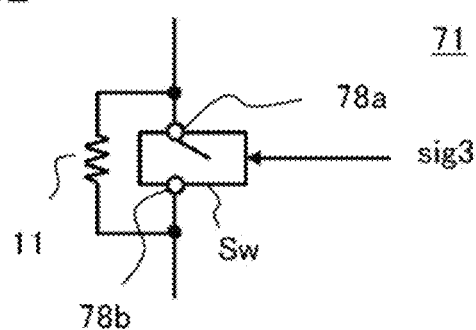
FIG. 32 is a diagram showing a configuration of a current limiting circuit of FIG. 31.
Figure 33:
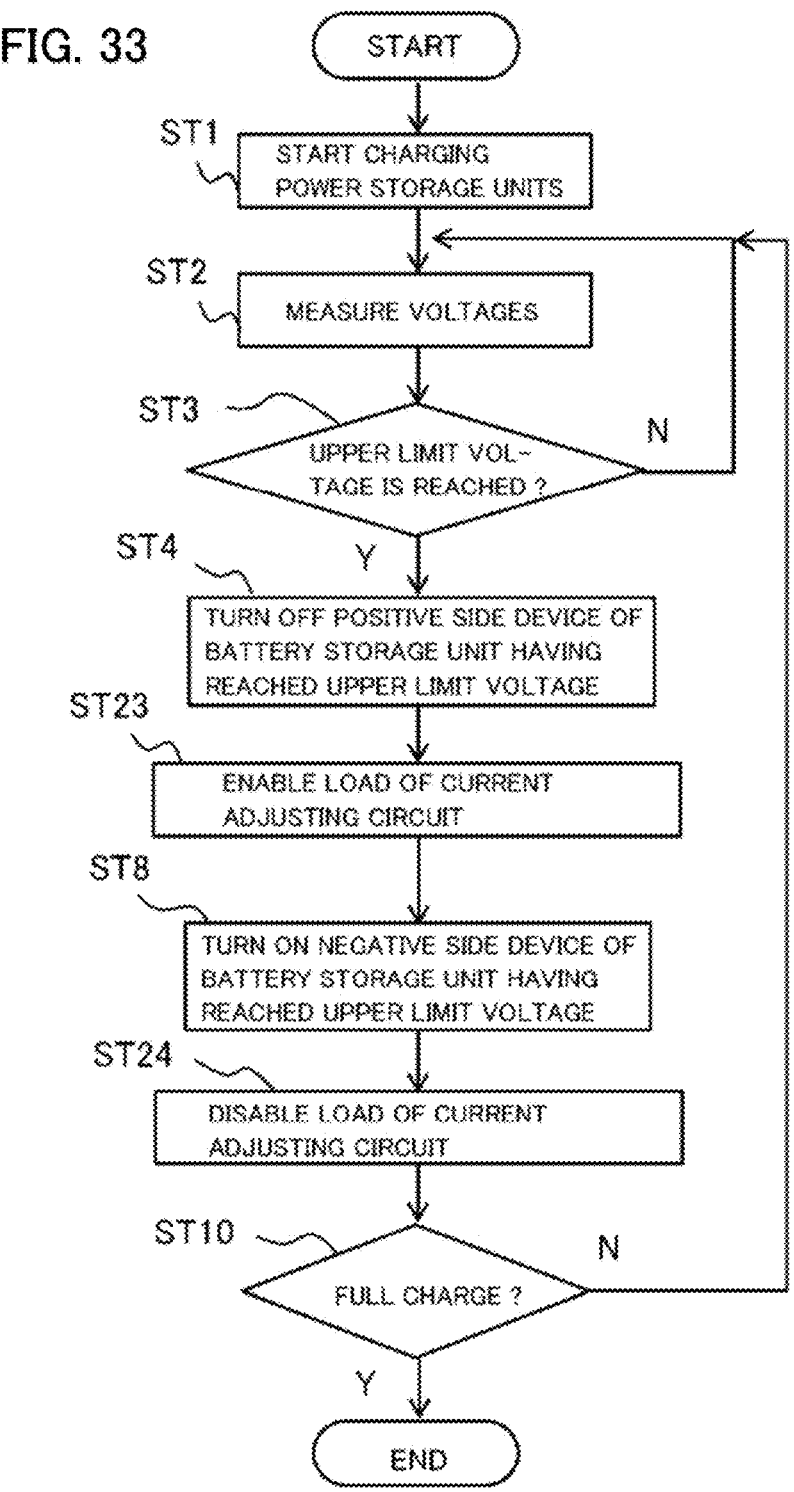
FIG. 33 is a flowchart explaining a charging operation of the power supply device according to Embodiment 4.
Figure 34:
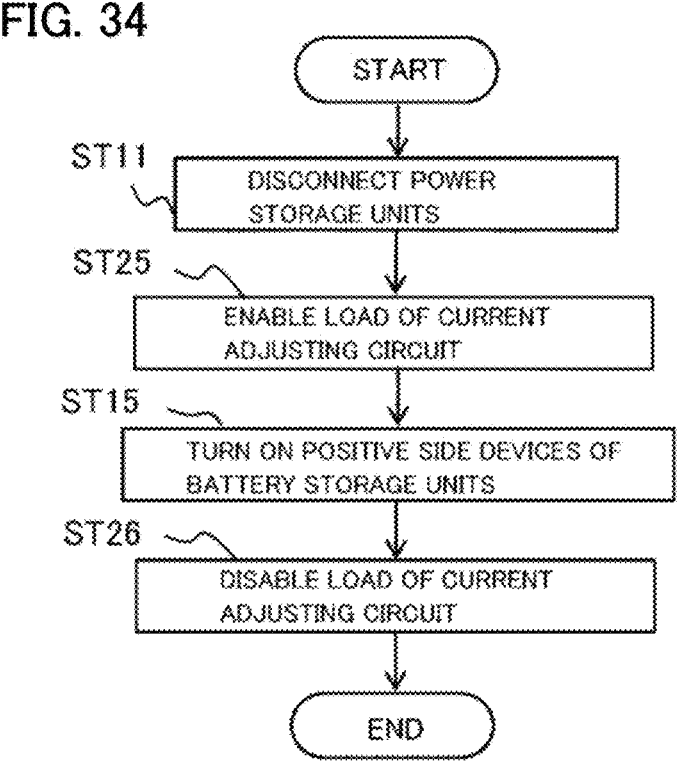
FIG. 34 is a flowchart explaining a reconnection operation of a separated battery in the power supply device according to Embodiment 4.

FIG. 31 is a diagram showing a configuration of a power supply device according to Embodiment 4, and FIG. 32 is a diagram showing a configuration of a current limiting circuit shown in FIG. 31. FIG. 33 is a flowchart explaining a charging operation of the power supply device according to Embodiment 4, and FIG. 34 is a flowchart explaining a reconnection operation of a separated battery in the power supply device according to Embodiment 4. The power supply device 80 of Embodiment 4 differs from the power supply devices 80 of Embodiment 1 to Embodiment 3 in that the current adjusting circuit 70 is a current limiting circuit 71. FIG. 31 shows an example in which the current limiting circuit 71 is applied as the current adjusting circuit 70 to the power supply device 80 according to Embodiment 1. A part different from the power supply device 80 of Embodiment 1 will be mainly described.

In the power supply device 80 of Embodiment 1 to Embodiment 3, examples have been described in which the power consumption circuit 10, which consumes the surplus power of the capacitor 1, is the current adjusting circuit 70. Since the power supply device 80 of Embodiment 1 to Embodiment 3 bypasses the bypass target battery Bb such as the deteriorated battery after the surplus power of the capacitor 1 is consumed by the operation of the power consumption circuit 10, it is possible to continue charging such that a large current does not flow to the remaining batteries. When the bypass target battery Bb such as the deteriorated battery is bypassed, also by limiting the current such that a large current does not flow from the capacitor 1 to the charging-continued battery pack, which is the remaining batteries, it is possible to continue charging such that a large current does not flow to the charging-continued battery pack. The power supply device 80 of Embodiment 4 is an example in which the current is limited by the current limiting circuit 71 such that a large current does not flow from the capacitor 1 to the charging-continued battery pack when the bypass target battery Bb such as the deteriorated battery is bypassed.

The current limiting circuit 71 includes the load 11 such as a resistor and a switching device Sw that are connected in parallel. The switching device Sw controls the flow and the cutoff of the current to the load 11. The current limiting circuit 71 is connected between the positive side of the capacitor 1 and the positive side wire 82p. In the current limiting circuit 71, the switching device Sw is normally controlled to be in the ON state, and both ends of the load 11 are short-circuited, so that the load 11 is disabled. The switching device Sw has terminals 78a and 78b, and when the switching device Sw is in the ON state, the terminals 78a and 78b are connected, and when the switching device Sw is in the OFF state, the terminals 78a and 78b are disconnected. When bypassing a bypass target battery Bb such as a deteriorated battery, the current limiting circuit 71 controls the switching device Sw to the OFF state, so that a current flows through the load 11 and the load 11 is enabled. When the switching device Sw is in the OFF state, the positive side of the capacitor 1 and the positive side wire 82p are connected through the load 11, and an increase in the current discharged from the capacitor 1 is suppressed. In other words, the current limiting circuit 71 can reduce the current value of the current discharged from the capacitor 1 and prevent the current from being larger. The switching device Sw shown in FIG. 31 is an example in which it is in the ON state, and the switching device Sw shown in FIG. 32 is an example in which it is in the OFF state. FIG. 31 shows an example in which the load 11 is a resistor. The switching device Sw may be the semiconductor switching device described in Embodiment 1 or a relay or the like.

Since the current limiting circuit 71 is the current adjusting circuit 70, the switching device Sw is controlled to be in the ON/OFF state by the current adjusting circuit control signal sig3. In the current limiting circuit 71 according to Embodiment 4, which is the current adjusting circuit 70, the control of the switching device Sw for enabling the load 11 is opposite to the control of the switching device Sc for enabling the load 11 of the current adjusting circuit 70 according to Embodiment 1. In the power supply device 80 according to Embodiment 1, by turning the switching device Sc to the ON state in the power consumption circuit 10, which is the current adjusting circuit 70, the load 11 is enabled to consume the surplus power of the capacitor 1, so that a large current does not flow to the remaining batteries when the bypass target battery Bb is bypassed. In contrast, in the power supply device 80 of Embodiment 4, by turning the switching device Sw to the OFF state in the current limiting circuit 71, which is the current adjusting circuit 70, the load 11 is enabled and the capacitor 1 is connected to the battery pack 50 via the load 11, so that a large current does not flow to the remaining batteries when the bypass target battery Bb is bypassed.

As with the switching device Sc, the case will be described in which the switching device Sw is turned to the ON state when the current adjusting circuit control signal sig3 of the high level is applied, and turned to the OFF state when the current adjusting circuit control signal sig3 of the low level is applied. During normal charging, the switching device Sw is turned to the ON state, and the load 11 is disabled. In this case, the switching control circuit 42 of the battery pack control circuit 40 sets the current adjustment selection signal sig11 to non-current adjustment selection. Specifically, when the current adjusting selection signal sig11 indicates the non-current adjustment selection, the signal sig11 is at the high level. The output circuit 43 of the battery pack control circuit 40 receives a current adjusting selection signal sig11 indicating the non-current adjustment selection, and turns the switching device Sw to the ON state. In this case, the output circuit 43 of the battery pack control circuit 40 outputs the current adjusting circuit control signal sig3 indicating the ON. Upon receiving the current adjusting circuit control signal sig3 indicating the ON, namely, the current adjusting circuit control signal sig3 of the high level, the current limiting circuit 71, which is the current adjusting circuit 70, turns on the switching device Sw to the ON state to disable the load 11.

When the bypass target battery Bb such as the deteriorated battery is bypassed, the switching device Sw is turned to the OFF state and the load 11 is enabled. In this case, the switching control circuit 42 of the battery pack control circuit 40 sets the current adjusting selection signal sig11 to current adjustment selection. Specifically, when the current adjusting selection signal sig11 indicates the current adjustment selection, the signal sig11 is at the low level. The output circuit 43 of the battery pack control circuit 40 receives the current adjusting selection signal sig11 indicating the current adjustment selection and turn the switching device Sw to the OFF state. In this case, the output circuit 43 of the battery pack control circuit 40 outputs the current adjusting circuit control signal sig3 indicating the OFF. Upon receiving the current adjusting circuit control signal sig3 indicating the OFF, namely, the current adjusting circuit control signal sig3 at the low level, the current limiting circuit 71, which is the current adjusting circuit 70, turns the switching device Sw to the OFF state to enable load 11.

The charging operation of the power supply device 80 according to Embodiment 4 will be described with reference to FIG. 33. The flowchart of FIG. 33 differs from the flowchart of FIG. 10 in that step ST5 to step ST7 for enabling the load 11 of the power consumption circuit 10 are replaced with step ST23, and step ST9 for disabling the load 11 of the power consumption circuit 10 is replaced with step ST24. A part different from those of Embodiment 1 will be mainly described. Step ST23 is executed after the battery positive side path closing step of step ST4 is executed. In step ST23, the battery pack control circuit 40 enables the load 11 of the current limiting circuit 71, which is the current adjusting circuit 70; that is, the load 11 is connected between the positive side of the capacitor 1 and the positive side wire 82p (capacitor current limiting start step). In the capacitor current limiting start step in step ST23, the switching device Sw of the current limiting circuit 71 is turned to the OFF state to enable the load 11. When the load 11 is enabled, the current from the capacitor 1 is limited. Since the capacitor current limiting start step in step ST23 starts the adjustment of the capacitor current Ic by the current adjusting circuit 70, it can also be called the capacitor current adjusting start step.

In step ST8, the battery pack control circuit 40 turns the switching device Sl* to the ON state, which is the negative side device of the power storage unit BU* of the battery having reached the upper limit voltage (bypass path opening step). Thereafter, in step ST24, the battery pack control circuit 40 disables the load 11 of the current limiting circuit 71, which is the current adjusting circuit 70; that is, the load 11 is made not to be connected between the positive side of the capacitor 1 and the positive side wire 82p (capacitor current limiting stop step). In the capacitor current limiting stop step of step ST24, the switching device Sw of the current limiting circuit 71 is turned to the ON state to disable the load 11. When the load 11 is disabled, the limiting of the current from the capacitor 1 is stopped. The capacitor current limiting stop step may be executed immediately after the execution of step ST8, or may be executed after a predetermined time; that is, after a predetermined set time has elapsed. In step ST10, the battery pack control circuit 40 determines whether the charging-continued battery pack voltage Vbs of the charging-continued battery pack is a voltage indicating the full charge (full charge determination step). When the charging-continued battery pack voltage Vbs is at a voltage indicating the full charge, charging is terminated, and when the charging-continued battery pack voltage Vbs is not at a voltage indicating the full charge, the process returns to step ST2 to continue charging. Since the capacitor current limiting stop step in step ST24 stops the adjustment of the capacitor current Ic by the current adjusting circuit 70, it can also be called the capacitor current adjusting stop step.

By executing each of the steps shown in FIG. 33, the power supply device 80 of Embodiment 4 can continue charging such that a large current does not flow to the remaining batteries when the deteriorated batteries or the like is bypassed. Note that, after the step ST2, if there is a battery that has reached the upper limit voltage, the battery is bypassed. Therefore, in the power supply device 80 of Embodiment 4, as in the power supply device 80 of Embodiment 1, all the batteries B1 to Bn can be fully charged even if variations in the deterioration of the batteries B1 to Bn exist. Further, the power supply device 80 of Embodiment 4 is not limited to the case where the battery is deteriorated and can also bypass a battery when the battery cannot be charged due to some failure.

As described in Embodiment 1, the operation after the completion of charging differs depending on how the power supply device 80 is used, but normally the bypass target battery Bb is connected in series with other batteries. That is, operations for constructing the battery pack 50 to which the bypass target battery Bb is reconnected is performed. The reconnection operations of the bypass battery will be described with reference to FIG. 34. The flowchart of FIG. 34 differs from that of FIG. 11 in that step ST12 to step ST14 for reducing the difference between the charging-continued battery pack voltage Vbs and the capacitor voltage Vc are replaced with step ST25, and step ST26 is added after step ST15.

After charging all the batteries B1 to Bn, the power storage units BU1 to BUn of the battery pack 50 are disconnected with respect to the positive side wire 82p and the negative side wire 82m in step ST11. Specifically, the battery pack control circuit 40 turns the switching devices Su1 to Sun and the switching devices Sl1 to Sln to the OFF state. In step ST25, the battery pack control circuit 40 enables the load 11 of the current limiting circuit 71, which is the current adjusting circuit 70; that is, the load 11 is connected between the positive side of the capacitor 1 and the positive side wire 82p (capacitor current limiting start step). Thereafter, in step ST15, the battery pack control circuit 40 turns the positive side devices in the power storage units BU1 to BUn of the battery pack 50, namely, the switching devices Su1 to Sun, to the ON state. In step ST26, the battery pack control circuit 40 disables the load 11 of the current limiting circuit 71, which is the current adjusting circuit 70; that is, the load 11 is made not to be connected between the positive side of the capacitor 1 and the positive side wire 82p (capacitor current limiting stop step). This capacitor current limiting stop step may be executed immediately after the execution of step ST8 or may be executed after a predetermined time; that is, after a predetermined set time has elapsed.

By executing the steps shown in FIG. 34, the power supply device 80 of Embodiment 4 can reconnect the battery pack 50 provided with the deteriorated battery, etc. with respect to the positive wire 82p and the negative side wire 82m without making a large current flow from the battery pack 50 to the capacitor 1.

The current limiting circuit 71 of Embodiment 4 can also be applied to the power supply device 80 in Embodiment 2 and Embodiment 3. The power supply device 80 of Embodiment 2 to which the current limiting circuit 71 is applied has the same effect as that of the power supply device 80 of Embodiment 2. The power supply device 80 of Embodiment 3 to which the current limiting circuit 71 is applied has the same effect as the power supply device 80 of Embodiment 3.

Note that, although various exemplary embodiments and examples are described in the present application, various features, aspects, and functions described in one or more embodiments are not inherent in a particular embodiment and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

DESCRIPTION OF REFERENCE NUMERALS AND SIGNS

1: capacitor, 10: power consumption circuit, 11: load, 20: charging circuit, 30: information detector, 40: battery pack control circuit, 50: battery pack, 51p1, 51p2, 51pn: positive side terminal (first terminal), 51m1, 51m2, 51mn: negative side terminal (second terminal), 70: current adjusting circuit, 71: current limiting circuit, 80: power supply device, B1, B2, Bn: battery, Bb: bypass target battery, Bg1, Bg2, Bgn: battery group, BU1, BU2, BUn: battery unit, Sc: switching device, Sw: switching device, sig1: state detection information, sig4: charging current change command, sigi1: charging current information, V1, V2, Vn: battery voltage, Vc: capacitor voltage, Vbs: charging-continued battery pack voltage

The invention claimed is:

1. A power supply device provided with a plurality of power storage units each of which has a battery, a first terminal, and a second terminal, the power supply device comprising:
a battery pack including the plurality of power storage units connected in series each of which has a first path and a second path, the first path connecting a positive side of the battery and the first terminal, the second path connecting a negative side of the battery, the second terminal, and the first terminal;
a capacitor connected in parallel to the battery pack;
a charging circuit to charge the battery pack;
a current adjusting circuit to adjust a current flowing from the capacitor to the positive side of the battery pack;
an information detector to output state detection information containing a battery voltage of the battery and a capacitor voltage of the capacitor; and
a battery pack control circuit to control opening/closing of the first path and opening/closing of the second path in the power storage unit, and the current adjusting circuit based on the state detection information, wherein
the current adjusting circuit includes a load through which a current flows and a switching device to control a flow and a cutoff of the current to the load,
the battery pack control circuit, when the battery having reached an upper limit voltage is detected based on the state detection information during charging of the battery pack, after closing the first path in the power storage unit having a bypass target battery that is the battery having reached the upper limit voltage and controlling the switching device in the current adjusting circuit to cause a current to flow through the load, opens the second path in the power storage unit including the bypass target battery, and then controls the switching device to cut off the current flow to the load.

2. The power supply device according to claim 1, wherein the current adjusting circuit is connected in parallel to the capacitor, and the load and the switching device are connected in series, and
the battery pack control circuit, after the switching device is turned to an ON state to cause a current to flow through the load, opens the second path when a charging-continued battery voltage is equal to or larger than the capacitor voltage, the charging-continued battery voltage being a total voltage of remaining batteries excluding the bypass target battery.

3. The power supply device according to claim 2, wherein the battery pack control circuit outputs a charging current change command for an instruction to decrease a charging current supplied by the charging circuit when the battery having reached the upper limit voltage is detected based on the state detection information during charging of the battery pack and outputs the charging current change command for an instruction to increase the charging current after the current adjusting circuit is controlled to cut off the current flow to the load, and
the charging circuit changes the charging current from a first charging current to a second charging current lower than the first charging current when receiving the charging current change command for the instruction to decrease the charging current and changes the charging current from the second charging current to the first charging current when receiving the charging current change command for the instruction to increase the charging current.

4. The power supply device according to claim 2, wherein the power storage unit comprises a battery group as the battery in which a plurality of battery cells are connected in series,
the first path is a path connecting a positive side of an uppermost battery cell in the battery group and the first terminal, and
the second path is a path connecting a negative side of a lowermost battery cell in the battery group and the second terminal and the first terminal.

5. The power supply device according to claim 1, wherein the current adjusting circuit is connected in parallel to the capacitor, and the load and the switching device are connected in series, and the battery pack control circuit, after the switching device is turned to an ON state to cause a current to flow through the load, opens the second path when a charging-continued battery voltage is equal to the capacitor voltage, the charging-continued battery voltage being a total voltage of remaining batteries excluding the bypass target battery.

6. The power supply device according to claim 5, wherein
the battery pack control circuit outputs a charging current change command for an instruction to decrease a charging current supplied by the charging circuit when the battery having reached the upper limit voltage is detected based on the state detection information during charging of the battery pack and outputs the charging current change command for an instruction to increase the charging current after the current adjusting circuit is controlled to cut off the current flow to the load, and
the charging circuit changes the charging current from a first charging current to a second charging current lower than the first charging current when receiving the charging current change command for the instruction to decrease the charging current and changes the charging current from the second charging current to the first charging current when receiving the charging current change command for the instruction to increase the charging current.

7. The power supply device according to claim 5, wherein
the power storage unit comprises a battery group as the battery in which a plurality of battery cells are connected in series,
the first path is a path connecting a positive side of an uppermost battery cell in the battery group and the first terminal, and
the second path is a path connecting a negative side of a lowermost battery cell in the battery group and the second terminal and the first terminal.

8. The power supply device according to claim 1, wherein the current adjusting circuit is connected in series between a positive side terminal of the battery pack and a positive side of the capacitor, and the load and the switching device are connected in parallel.

9. The power supply device according to claim 8, wherein
the battery pack control circuit outputs a charging current change command for an instruction to decrease a charging current supplied by the charging circuit when the battery having reached the upper limit voltage is detected based on the state detection information during charging of the battery pack and outputs the charging current change command for an instruction to increase the charging current after the current adjusting circuit is controlled to cut off the current flow to the load, and
the charging circuit changes the charging current from a first charging current to a second charging current lower than the first charging current when receiving the charging current change command for the instruction to decrease the charging current and changes the charging current from the second charging current to the first charging current when receiving the charging current change command for the instruction to increase the charging current.

10. The power supply device according to claim 8, wherein
the power storage unit comprises a battery group as the battery in which a plurality of battery cells are connected in series,
the first path is a path connecting a positive side of an uppermost battery cell in the battery group and the first terminal, and
the second path is a path connecting a negative side of a lowermost battery cell in the battery group and the second terminal and the first terminal.

11. The power supply device according to claim 1, wherein
the battery pack control circuit outputs a charging current change command for an instruction to decrease a charging current supplied by the charging circuit when the battery having reached the upper limit voltage is detected based on the state detection information during charging of the battery pack and outputs the charging current change command for an instruction to increase the charging current after the current adjusting circuit is controlled to cut off the current flow to the load, and
the charging circuit changes the charging current from a first charging current to a second charging current lower than the first charging current when receiving the charging current change command for the instruction to decrease the charging current and changes the charging current from the second charging current to the first charging current when receiving the charging current change command for the instruction to increase the charging current.

12. The power supply device according to claim 11, wherein
the charging circuit includes a current sensor to detect the charging current supplied to the battery pack and to output charging current information, and
the battery pack control circuit outputs the charging current change command based on the charging current information and the capacitor voltage.

13. The power supply device according to claim 12, wherein
the power storage unit comprises a battery group as the battery in which a plurality of battery cells are connected in series,
the first path is a path connecting a positive side of an uppermost battery cell in the battery group and the first terminal, and
the second path is a path connecting a negative side of a lowermost battery cell in the battery group and the second terminal and the first terminal.

14. The power supply device according to claim 11, wherein the battery pack control circuit outputs the charging current change command based on a decrease status of the capacitor voltage.

15. The power supply device according to claim 14, wherein
the power storage unit comprises a battery group as the battery in which a plurality of battery cells are connected in series,
the first path is a path connecting a positive side of an uppermost battery cell in the battery group and the first terminal, and
the second path is a path connecting a negative side of a lowermost battery cell in the battery group and the second terminal and the first terminal.

16. The power supply device according to claim 11, wherein
the power storage unit comprises a battery group as the battery in which a plurality of battery cells are connected in series, the first path is a path connecting a positive side of an uppermost battery cell in the battery group and the first terminal, and the second path is a path connecting a negative side of a lowermost battery cell in the battery group and the second terminal and the first terminal.

17. The power supply device according to claim 1, wherein the power storage unit comprises a battery group as the battery in which a plurality of battery cells are connected in series, the first path is a path connecting a positive side of an uppermost battery cell in the battery group and the first terminal, and the second path is a path connecting a negative side of a lowermost battery cell in the battery group and the second terminal and the first terminal.

18. The power supply device according to claim 17, wherein the battery pack includes the battery group whose time needed to reach the upper limit voltage is different during charging.

19. The power supply device according to claim 1, wherein the battery pack includes the battery whose time needed to reach the upper limit voltage is different during charging.

20. A battery pack charging method of charging a battery pack by a power supply device provided with a plurality of power storage units connected in series each of which has a battery, a first terminal, and a second terminal, the method performed by the power supply device, comprising:

a voltage measurement step of measuring a battery voltage of the battery when the battery pack is charged;

an upper limit voltage determination step of determining whether or not the battery voltage measured in the voltage measurement step has reached an upper limit voltage;

a first path closing step of closing a first path in the power storage unit including a bypass target battery that is the battery having reached the upper limit voltage in a case where the battery voltage reaches the upper limit voltage in the upper limit voltage determination step;

a capacitor current adjusting start step of controlling a switching device in a current adjusting circuit to cause a current to flow through a load;

a second path opening step of opening a second path in the power storage unit including the bypass target battery after the capacitor current adjusting start step; and a capacitor current adjusting stop step of controlling the switching device to cut off the current flow to the load, wherein the power storage units each has the first path and the second path, the first path connecting a positive side of the battery and the first terminal, the second path connecting a negative side of the battery, the second terminal, and the first terminal, the power supply device includes a capacitor connected in parallel to the battery pack and the current adjusting circuit to adjust a current flowing from the capacitor to the positive side of the battery pack, and the current adjusting circuit includes the load through which the current flows and the switching device to control a flow and a cutoff of the current to the load.

* * * * *